United States Patent [19]

Conway et al.

[11] Patent Number: 5,652,849
[45] Date of Patent: Jul. 29, 1997

[54] APPARATUS AND METHOD FOR REMOTE CONTROL USING A VISUAL INFORMATION STREAM

[75] Inventors: Lynn A. Conway, Jackson, Mich.; Charles J. Cohen, Philadelphia, Pa.

[73] Assignee: Regents of the University of Michigan, Ann Arbor, Mich.

[21] Appl. No.: 404,886

[22] Filed: Mar. 16, 1995

[51] Int. Cl.$^6$ .................................................. G06F 3/00
[52] U.S. Cl. .............................. 395/327; 364/424.029; 348/115
[58] Field of Search ................... 395/155–161, 395/327; 348/115, 114, 113; 364/424.029

[56] References Cited

U.S. PATENT DOCUMENTS

| | | |
|---|---|---|
| 2,978,538 | 4/1961 | Breese . |
| 3,542,015 | 11/1970 | Campbell . |
| 3,691,295 | 9/1972 | Fisk . |
| 4,636,137 | 1/1987 | Lemelson . |
| 4,855,822 | 8/1989 | Narendra et al. . |
| 4,887,223 | 12/1989 | Christian .................. 364/518 |
| 4,996,592 | 2/1991 | Yoshida . |
| 5,079,634 | 1/1992 | Hosono . |
| 5,109,228 | 4/1992 | Banaszak . |
| 5,155,683 | 10/1992 | Rahim . |
| 5,182,641 | 1/1993 | Diner et al. .................. 358/103 |
| 5,236,199 | 8/1993 | Thompson, Jr. . |
| 5,331,413 | 7/1994 | Diner .................. 348/159 |

Primary Examiner—Raymond J. Bayerl
Assistant Examiner—A. Katbab
Attorney, Agent, or Firm—Harness, Dickey & Pierce, P.L.C.

[57] ABSTRACT

Systems and methods for controlling devices remotely by embedding command information within video signals. The command information includes gestures or icons which are imbedded into the video signal and enable the user to interpret the command information by viewing the icon or gesture on a monitor or display device. By viewing the monitor or display device, the user can determine what command information is conveyed within the video signal. Further, imbedding the visually interpretable icon or gesture within the video signal facilitates transmitting the video signal having the command information imbedded therein using analog to digital conversions and reconversions and transmission through any of a various number of switching networks. The remote devices may by any of a number of electronically controlled electrical or mechanical devices. A device controller at the remote end receives, the decoded command information and generates the appropriate commands to operate the controlled device.

41 Claims, 17 Drawing Sheets

| 1 | 1 | 1 | 0 | -1 | -1 | -1 | 0 |
|---|---|---|---|---|---|---|---|
| 1 | 1 | 1 | 1 | 1 | 0 | -1 | -1 |
| 1 | 1 | 1 | 1 | 1 | 0 | -1 | -1 |
| 1 | 1 | 1 | 1 | 1 | 1 | 1 | 0 |
| 1 | 1 | 1 | 1 | 1 | 1 | 1 | 0 |
| 0 | 0 | 1 | 1 | 1 | 0 | -1 | -1 |
| 0 | 0 | 1 | 1 | 1 | 0 | -1 | -1 |
| -1 | -1 | -1 | 0 | -1 | -1 | -1 | 0 |

CENTER ICON

Fig-5a

| -1 | -1 | 0 | 1 | 1 | 1 | 0 | 0 |
|---|---|---|---|---|---|---|---|
| -1 | -1 | -1 | -1 | 0 | 1 | 1 | 1 |
| -1 | -1 | -1 | -1 | 0 | 1 | 1 | 1 |
| -1 | -1 | -1 | -1 | -1 | -1 | 0 | 1 |
| -1 | -1 | -1 | -1 | -1 | -1 | 0 | 1 |
| -1 | -1 | -1 | -1 | 0 | 1 | 1 | 1 |
| -1 | -1 | -1 | -1 | 0 | 1 | 1 | 1 |
| 0 | -1 | 0 | 1 | 1 | 1 | 0 | 0 |

PAN/TILT ICON

Fig-5b

| 0 | 1 | 1 | 1 | 0 | -1 | -1 | -1 |
|---|---|---|---|---|---|---|---|
| 0 | 1 | 1 | 1 | 0 | -1 | -1 | -1 |
| -1 | -1 | 0 | 1 | 1 | 0 | 0 | -1 |
| -1 | -1 | 0 | -1 | 1 | 1 | 0 | -1 |
| -1 | -1 | -1 | -1 | 0 | 1 | 1 | 0 |
| -1 | -1 | -1 | -1 | 0 | 1 | 1 | 0 |
| -1 | -1 | -1 | -1 | -1 | -1 | 0 | 0 |
| -1 | -1 | -1 | -1 | -1 | -1 | 0 | 0 |

MOVE ICON

Fig-5c

| IN PRESENT STATE | IF INPUTS ARE: | NEXT STATE WILL BE: | OUTPUTS | STATE CHANGE? |
|---|---|---|---|---|
| WAIT | ICON= NULL | WAIT | NULL | NO |
|  | ICON= C | HOLD ICON | RH BOUND (A, B) | YES |
| HOLD ICON | TH= 0 AND (ICON= NULL OR X, Y < BOUND (A, B) | WAIT | NULL | YES |
|  | TH= 0 AND (ICON= C AND X, Y < BOUND (A, B)) | HOLD ICON | NULL | NO |
|  | TH= 1 | SEND GESTURE | GESTURE INFO | YES |
| SEND GESTURE | NO SEND ACKNOWLEDGE | SEND GESTURE | NULL | NO |
|  | SEND ACKNOWLEDGED | CLEAR ICON | RC, NULL | YES |
| CLEAR ICON | TC= 0 AND ICON= NULL | CLEAR ICON | NULL | NO |
|  | TC= 1 | WAIT | NULL | YES |
|  | ICON ≠ NULL | CLEAR ICON | RC | NO |

Fig-11

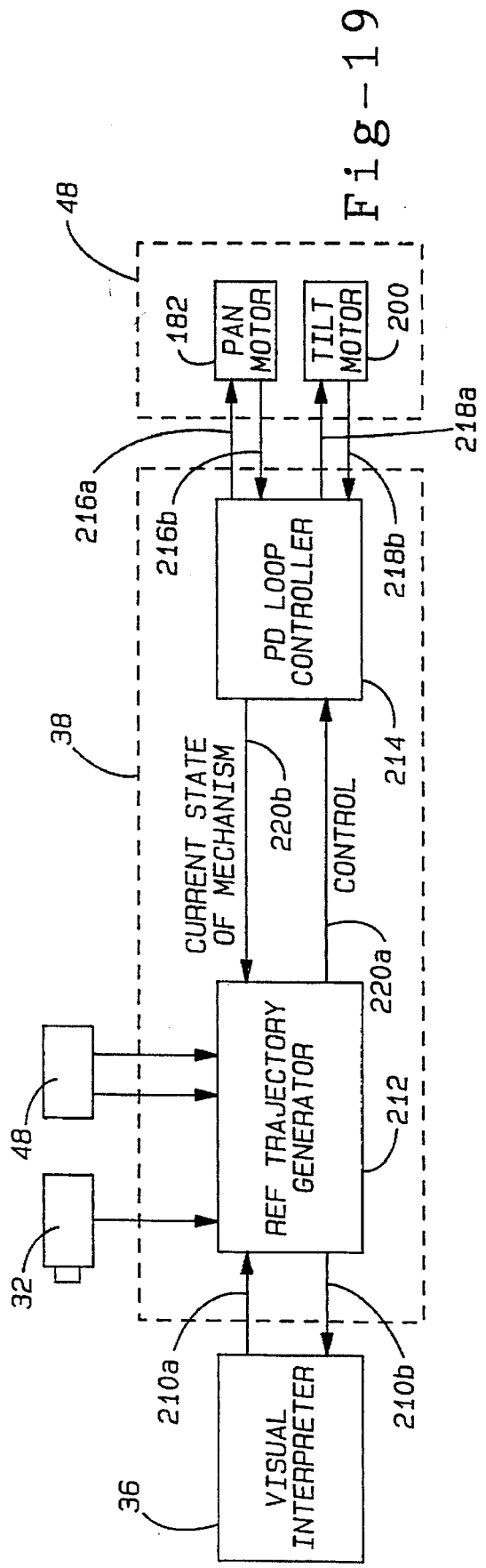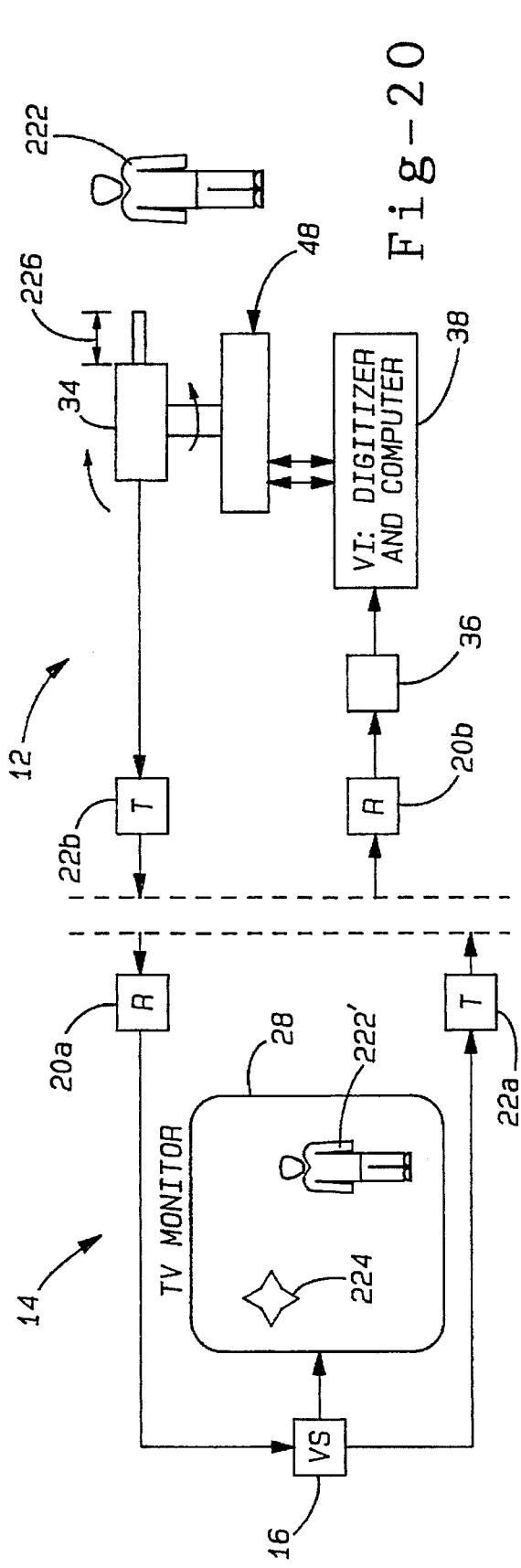

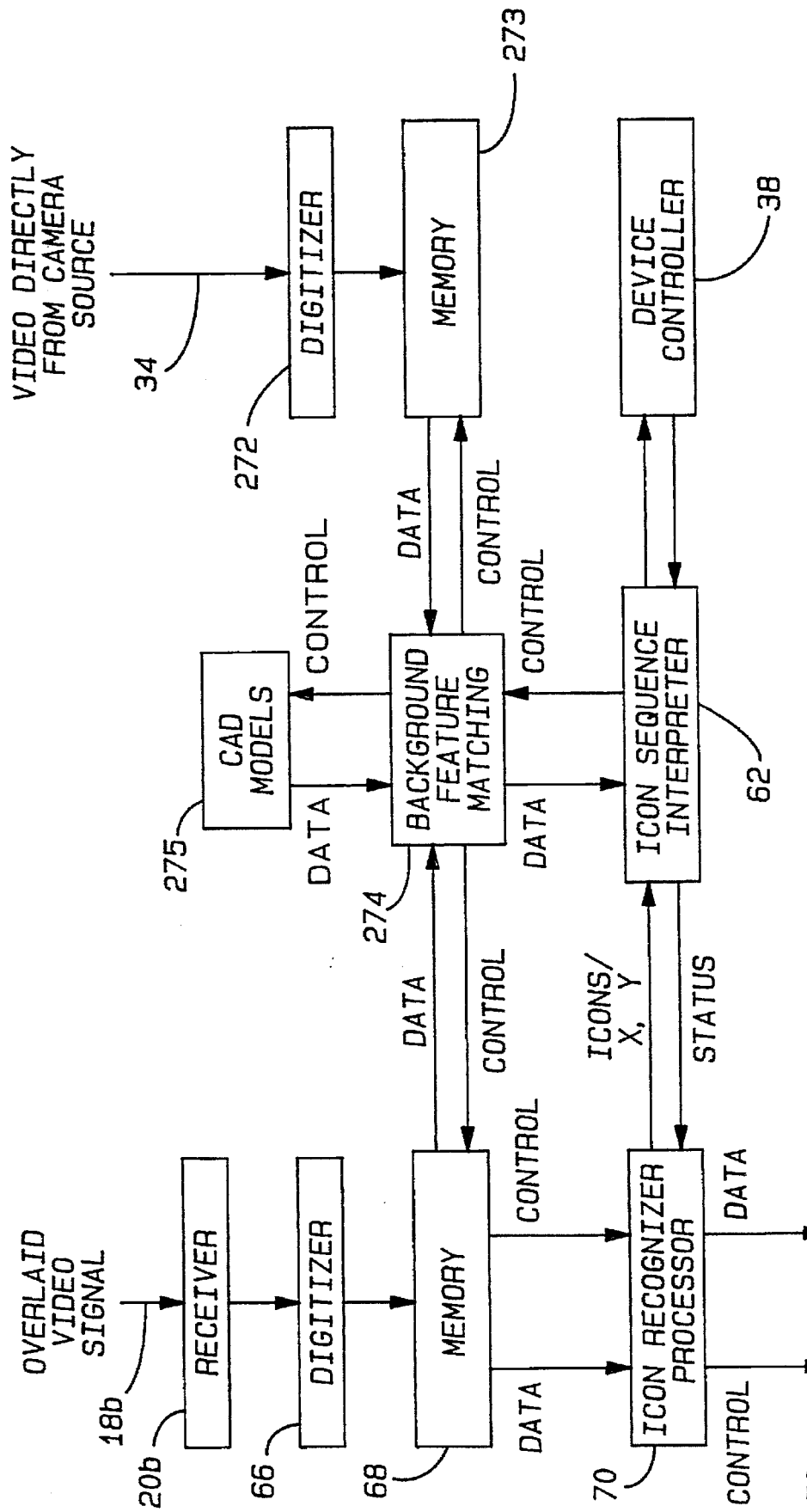

APPARATUS AND METHOD FOR REMOTE CONTROL USING A VISUAL INFORMATION STREAM

This invention relates generally to video telecommunications to control remotely located devices. More particularly, this invention relates to inclusion of iconic information within the video signal received from the remote site, where the video signal is returned to the remote site and the iconic information is decoded into control information to control the remotely located device.

BACKGROUND OF THE INVENTION

The availability of relatively inexpensive transmission of video signals has increased dramatically over the last few years. Specifically, many phone and cable television companies have been allowed by the Federal Communications Commission (FCC) to install bundled telephone and cable television systems using the most recent technologies, typically fiber optic cables. With the proliferation of such systems and the bundling of telephone and video communications, it is readily apparent that in the near future traditional audio telephone communications will most likely migrate towards audio/video communications systems whereby an operator at one site receives audio and video signals which enables the operator to both see and hear what occurs at a remote site, and vise versa.

Initial systems will include merely fixed cameras and video monitors. A method and apparatus for controlling pointers in video images at remote sites from local sites is disclosed in U.S. patent application Ser. No. 07/989,126, filed Dec. 11, 1992, entitled System and Method for Teleinteraction, now U.S. Pat. No. 6,444,476, assigned to the Assignee of the present invention and herein incorporated by reference. Other improved systems will most likely include the capability of tracking the operator around the room and enable the operator more freedom while conducting the televideo conference. In yet another configuration, however, one can readily envision where an operator at one site may desire to control the camera at a remote site without requiring the operator at the remote site to reposition the camera. Such systems lend themselves easily to, for example, home security systems where users could initiate a telephone conference to their own home and select and pan through rooms where the cameras are located in order to check the condition of those particular rooms. For example, a user may want to initiate a telephone conference with their own home on an Integrated Services Digital Networks (ISDN) phone-based video link when no one is home. The user could then pan and tilt the remote video camera to view the room and insure its condition.

Presently, some security camera control systems do enable control of cameras remote to an operator's location, and the operator can manipulate controls such as a mouse or a joy stick to cause the camera to pan and tilt in the specified direction. These systems, however, use a separate, digital communication link to send encoded camera control signals to the remote camera, separate from the video signals. A disadvantage of such systems is that the separate communication link limits control of the camera to a specific configuration of the camera and the operator control into a specific, unique system of hardware and low level communications protocols.

In other video communications systems, the idea of imbedding control information on a separate, digital communication link may be overcome in video communications systems by encoding control signals into the actual video stream. These systems typically utilize the currently unused scan lines in the video frames and provide control information which is used by decoding devices at receiving site to add additional information to the picture. For example, in closed caption systems, the unused video lines are used to encode information which is decoded at the receiving site. A decoding device decodes and inserts the decoded information onto the screen so that subtitles appear which correspond to the words being spoken by the characters in the picture. Such systems have proved useful to the hearing impaired and are relatively effective for systems where the receiving unit receives the video signal directly from the source. Examples of such systems include a local television station broadcasting a signal through an antenna where the signal is received by the antenna of a television set or a cable television system receiving and signals with an antenna located at the broadcasting source. That is, the communication link is a direct link with minimal compression or transfer through switching networks.

However, other audio/video communications arenas in which this invention is most useful involve substantial compression, transmission through digital switching networks, and decompression. Such signal decompression, conditioning, switching, and the like typically degrade the information encoded into the unused scan lines of a closed caption video signal so that the signal cannot reasonably be coded into the information to be placed on the screen as subtitles. Furthermore, such communication may occur across several different video format standards (such as NTSC, PAL, SECAM, and HDTV). The conversion of the video signal from one to another of these standards can potentially also modify or remove any unused scan line codes. Thus, it is desirable to provide a more robust approach to embedding control information into transmitted digital signals where the control information experiencing degradation through multiple compression, standards conversions, and/or switching networks remains useable at the remote site to effect the desired control.

Further, current systems which offer any form of embedded control information in audio or video signals also suffer from the requirement that expensive equipment be located at both the sites generating the control information and sites receiving the control information. Such configurations typically are turnkey systems where specific control information generating devices at the local site must match exactly the devices which decode the control information at the remote site. Thus, the signalling and decoding devices tend to be function specific rather than enabling universal control of a number of devices. Ideally, but hereto not yet achieved, the site generating the control information includes a multipurpose device which desirably controls a number of varied remote sites and remote devices. In this manner, a user need not purchase a specific signalling device and place a specifically designed decoding and control device for use at the remote site. Thus, it is further desirable to provide a relatively inexpensive, universal signalling device which is operable to control a number of remote devices and to provide a system having remote device controllers which can interpret a variety of incoming control information from a variety of control information generating sources.

Thus, it is an object of this invention to provide a communication link between remote and local sites which merely requires a two-way video link, which would normally be present rather than two independent, communication links, thereby limiting hardware requirements to relatively inexpensive hardware.

It is a further object of the invention to intercept a visual information stream from the remote site, add iconic visual information to the information stream using a visual signaller that encodes the desired control actions, and send the augmented video signal back to the original site.

It is a further object of the invention that an image processor decodes the visual control information using a visual interpreter at the remote end to determine the required control actions for a remote device by means of remote device control instructions communicated in iconic visual form.

It is a further object of this invention to provide visually iconic information in a format related to the desired control responses to facilitate use and to make use of the command generator to make device control more intuitive to the operator.

It is a further object of this invention to provide iconic information which is visually readable by an operator at a local site and visually readable by an operator at a remote site so that the visually iconic information when read by a human defines to the human the desired control response.

It is a further object of the invention to provide at a local site an apparatus for generating control information to control a device at a remote site where the apparatus generates information in iconic format visually decipherable by a human being and the iconic information describes general and specific operational goals for the remote device.

It is a further object of the invention that the apparatus for generating control information generates iconic information which is decipherable by a plurality of remote device controllers which are operable to control specific devices, and iconic information generated by the apparatus for generating control information indicates operational goals for the controlled device where the operational goal information depends on the particular device being controlled.

SUMMARY OF THE INVENTION

A method and apparatus for enabling an operator to receive an incoming video signal and to imbed command information in an outgoing video signal in order to remotely control a device. The apparatus includes a device for generating command information in the form of a visually iconic gesture. The visually iconic gesture is interpretable by the operator and conveys command information in accordance with its appearance and location within the outgoing video signal. A processor receives the outgoing video signal having the visually iconic gesture and decodes the iconic gesture into the command information conveyed by the iconic gesture. The processor then outputs the command information to a device controller. The device control receives the command information output by the processor and translates the command information into control commands for operating the device in accordance with the command information conveyed in the visually iconic gesture.

Further objects, features and advantages of the invention will become apparent from a consideration of the following description and the appended claims when taken in connection with the accompanying drawings.

BRIEF DESCRIPTION OF THE DRAWINGS

FIGS. 5a, 5b and 5c depict pattern masks which represent portions of recognizable icons which are used to identify the icons which could be overlaid by the visual signaller;

FIG. 11 is a transition table corresponding to the state table of FIG. 10 and defining the state of the state machine of FIG. 9 for executing a centering command;

FIG. 19 is an expanded block diagram for the device controller of FIG. 1 for transforming visual command information to motor control information to manipulate the camera base;

FIG. 20 depicts a zoom command for effecting zoom-in and zoom-out control of the camera in addition to manipulating the camera base;

FIG. 28 depicts a block diagram with the re-registration module depicted in FIG. 25 including the additional feature of having CAD models with which to compare the signals sent and received by the remote site for identifying objects of known shapes at predetermined locations within the CAD models.

DETAILED DESCRIPTION OF THE DRAWINGS

Figure 1:
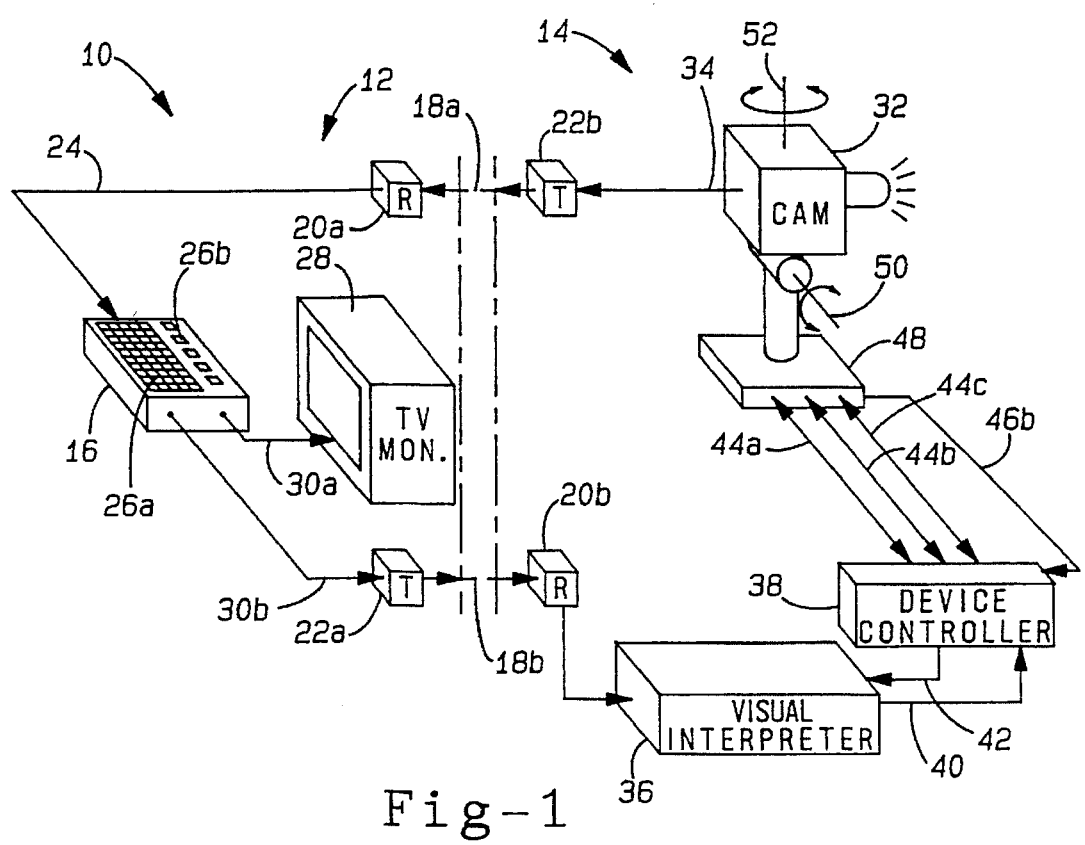
FIG. 1 is a block diagram of the visual, remote control system disclosed according to the principles of the present invention.

FIG. 1 depicts a block diagram of the remote control system 10. The remote control system 10 includes a local site 12 and a remote site 14. By convention, local site 12 refers to the controlling site or the site where an operator resides and directs control of a device at the remote site 14. Similarly, remote site 14 typically refers to the site where the device to be controlled is located and where an operator may, but need not be stationed. A two-way video communications link 18a and 18b interconnects local site 12 and remote site 14. Video communication links or lines 18a and 18b combine to form a bi-directional, video communication line for transmitting video signals in analog or digital format from remote site 14 to local site 12, depicted as video link 18a, and for transmitting a video signal in analog or digital format from local site 12 to remote site 14, depicted on video link 18b. It should be noted that while shown separately, video links or lines 18a and 18b represent a typical, bi-directional audio/video communication line, as are well known in the art. Of course, it would be understood by one skilled in the art that video communications lines 18a and 18b are separate lines bundled to effect bi-directional communication as shown in FIG. 1 and may optionally provide audio and visual communications, depending upon the particular application.

Because communications between local site 12 and remote site 14 may not normally occur over direct, hard-wired lines, but may occur over switching networks which may be multiplexed, the video signals transmitted between local site 12 and remote site 14 are shown as conditioned for improved for more accurate or efficiency transmission then decoded. That is, in order to transmit a video signal from remote site 14 to local site 12 and from local site 12 to remote site 14, the video signals may be converted from analog to digital format (or may already be in digital format) compressed using data compression algorithms well known in the art in order to decrease the bandwidth requirement of the channel on which the video signals are transferred. For example, the video signals may be transmitted over a digital switching network in order to allow for compression and more efficient data transfer using compression algorithms. Communications interface transmitters 22a and 22b at local site 12 and remote site 14, respectively provide the digitization and data compression for transmission to the remote site 14 and local site 12. The video signals received by local site 12 and remote site 14, respectively, are then decompressed and optionally reconverted to analog format. The digitization and compression described herein may typically be useful for implementation on a T1 or ISDN telephone teleconference link, or other digitized, encoded, compressed (then decompressed at the receiving end) communication links. Such digitization and compression is also useful for internet communications using CUSeeMe formats or slow frame video.

Referring to local site 12, communications adapter 20a receives and decodes the incoming video signal and outputs a decoded video signal which is input to visual signaller 16. Visual signaller 16 comprises a graphics locator pad 26a (or joy stick or track ball controller) and a plurality of icon selectors 26b. Output from the visual signaller 16 is input into television monitor 28 on output line 30a and via output video line 30b. Visual signaller 16 outputs a video signal similar to the incoming video signal with the addition of one or a number of graphics pointers or icons overlaid onto the video signal. The operator uses the graphics locator pad 26a to position a pointer overlaid on the incoming video signal 24, the result of which is displayed on monitor 28. Visual signaller 16 also includes one or a plurality of icon selectors 26b. Icon selectors 26b enable the operator to select a desired function by pressing a selected one or more of the icons in the icon selector 26b associated with that particular function. To be described further herein, icon selector 26b may modify the icon or pointer overlaid onto the incoming video signal and appearing on the video monitor 28. Visual signaller 16 also outputs a signal, in analog or digital format, depending upon the implementation, on output line 30b which is input to communications interface transmitter 22a. The video signal output by visual signaller 16 on output line 30b may optionally be a video overlaid signal comprising an icon overlaid by visual signaller 16 onto the incoming video signal received from the remote site 14. Alternatively, the video signal output on line 30b may consist only of the icon selected by icon generator 26b as positioned by the graphics locater pad 26a, but with a background of a predetermined solid color rather than a background of the video signal received from remote site 14.

Referring to remote site 14, camera 32 captures a video image which it then outputs on line 34 to communications interface transmitter 22b for optional compression, digitization, or the like (depending upon the application) and transmission to local site 12. Camera 32 may be any of a number of video cameras known in the art may output a signal in either analog or digital format, depending upon the particular application. In will be understood by one skilled in the art that the video signals may be either analog or digital signals, depending upon the particular implementation. For simplicity, analog video signals will be assumed throughout the specification. An incoming video compression signal having overlaid iconic information is received (and when using compression is decompressed) by communications interface receiver 20b (which outputs a picture signal) and then output to visual interpreter 36 to be described in greater detail herein, with respect to FIGS. 3–16. Visual interpreter 36 scans the incoming video image for any iconic information overlaid by visual signaller 16. If the visual interpreter finds an icon, the visual interpreter decodes the iconic information into commands which the visual interpreter 36 generates and sends to device controller 38. Visual interpreter 36 and device controller 38 communicate via a task or control line 40 and status line 42. Control line 40 transmits commands generated by visual interpreter 36 to device controller 38, while status line 42 transmits the status of the controlled device, to be described further herein, from device controller 38 to visual interpreter 36. Device controller 38 outputs control commands on control lines 44a, 44b, and 44c which are input to the controllable base 48 on which camera 32 is mounted. As depicted in FIG. 1, controllable base 48 operates in two degrees of freedom about tilt axis 50 and pan axis 52. Of course, it would be understood by one skilled in the art that depending on the particular controllable base 48, camera 32 could be manipulated in any of a number of additional directions, such as up and down via a telescoping neck, or side to side, or front to back for controllable bases configured for enabling such motion. In the embodiment described herein, device controller 38 outputs control signals on control lines 44a, 44b, and 44c which represent a pan signal, on line 44a, a tilt signal, on line 44b, and a camera control signal, on line 44c. Of course, it would be understood by one skilled in the art that depending on the particular controllable base 48 and the degrees of freedom in which controllable base 48 may be manipulated, control lines 44a, 44b, and 44c may be implemented as a single line transmitting multiplexed control commands or a plurality of lines, or a combination thereof. Further, device controller 38 also receives a feedback signal on status line 46b from controllable base 48.

As a brief overview to the operation of remote control system 10, the remote control system 10 is directed to enabling an operator located at local site 12 to control from the local site 12 one or a number of the operations of controllable base 48 or camera 32 at remote site 14. Briefly, this is accomplished by overlaying at local site 12 the video signal received from remote site 14 with visual, iconic information or, alternatively, outputting a video signal having an icon against a predetermined background (also referred to herein as overlaying) which may be decoded into control commands to manipulate controllable base 48 or camera 32. Visual signaller 16 overlays the visual, iconic control commands through a combination of icon selections using icon selectors 26b positioning and the pointers or icons (using graphics locator pad 26a) overlaid by the visual signaller 16 and displayed on monitor 28. A video signal having the icon against a background of the incoming video signal or a predetermined background is also output by local site 12 to remote site 14. Visual interpreter 36 obtains the visual, iconic information overlaid by visual signaller 16 as control or reference trajectory commands output to device controller 38. Device controller 38 in turn translates the positioning commands into control commands applied to controllable base 48, the control commands causing the desired movement about tilt axis 50 and pan axis 52.

Figure 2:
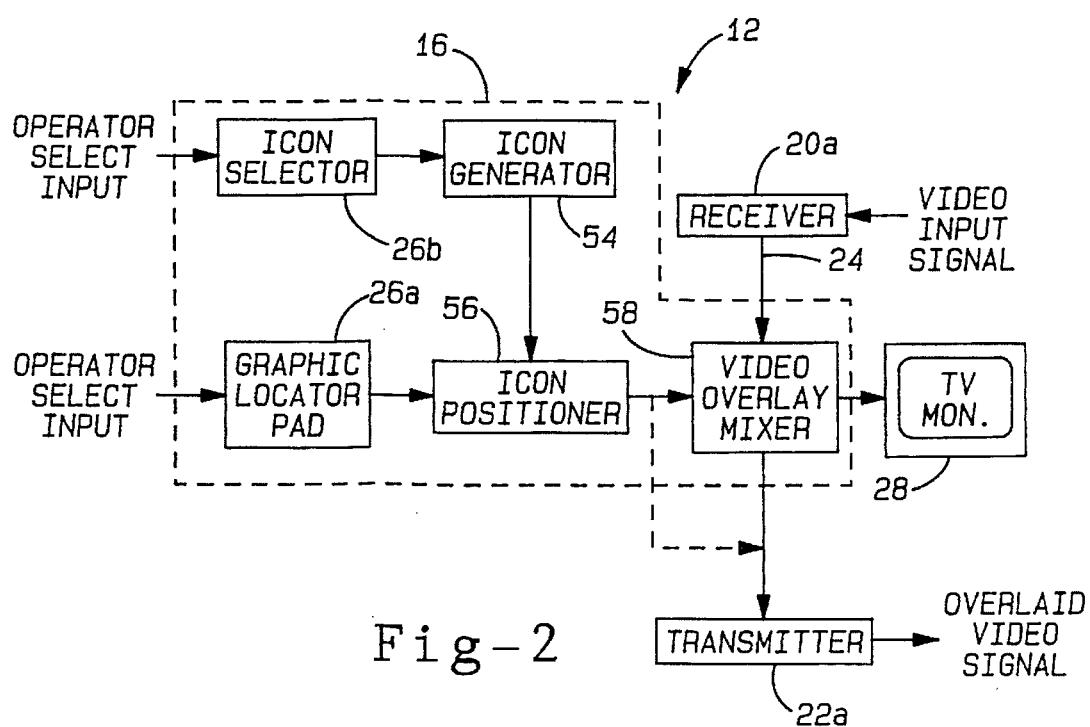
FIG. 2 is an expanded block diagram of the visual signaller depicted in FIG. 1 for generating visual, iconic control information.

FIG. 2 depicts a block diagram of visual signaller 16, which is used to overlay an icon selected by the operator and position the icon selected by the operator. It will be understood by one skilled in the art that an icon may be any of a number of visual cues that can be located on the video image with the pad, joystick, or track ball. An icon might take the form of a simple arrow or pointer, or other shape suggestive of the intended function. The size, color, orientation, and movements of an icon can also be varied to create gestures to convey intended functions. In addition, a chroma-key overlay of real objects such as a hand pointing a finger onto the image could also be used as an icon. In operation, the operator selects a specific icon to overlay onto the incoming video image received from remote site 14. Icon selector 26b provides a signal to icon generator 54 in accordance with the operator input. Icon generator 54 in turn outputs the selected icon to be overlaid onto the incoming video signal. The output from icon generator 54 is input to icon positioner 56. The operator provides position information through graphics locator pad 26a which also outputs a signal to icon positioner 56. Icon positioner 56 combines the selected icon information and the particular position in which the selected icon is to appear and outputs the signal to video overlay mixer 58. Video overlay mixer 58 receives both the iconic information in accordance with the operator selections and the incoming video signal received from remote site 14. Video overlay mixer 58 then outputs the video signal with the selected icon overlaid in the selected position. In this particular embodiment, video overlay mixer 58 outputs two identical signals, one of which is input to monitor 28 and the other of which is input to communications interface transmitter 22a, described above with respect to FIG. 1. In an alternative embodiment, video overlay mixer can output differing signals to monitor 28 and to communications interface transmitter 22a. In the alternative embodiment, video overlay mixer outputs to monitor 28 a video signal having the incoming video signal on which is overlaid the icon in accordance with icon positioning information from icon positioner 56. The communications interface transmitter 22a video overlay mixer in the alternative embodiment outputs the icon in accordance with the position information output by icon positioner 56 overlaid onto a predetermined background, not the incoming video signal received from the remote site 14. Visual signaller 16 may be any one of a number of commercially available, off-the-shelf overlay devices known to those skilled in the art. Alternatively, visual signaller 16 may be assembled from a number of individual components equally well known to those skilled in the art.

Figure 3:
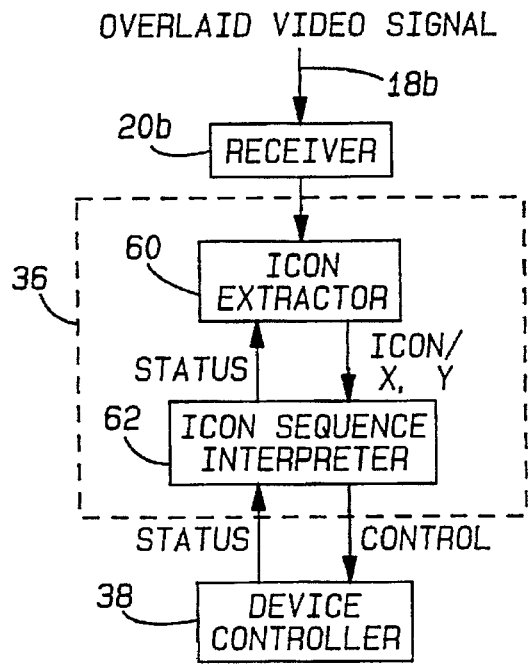
FIG. 3 is an expanded block diagram of the visual interpreter depicted in FIG. 1 for extracting and identifying the iconic, visual information from the visual stream to control the remotely located device.

FIG. 3 depicts an expanded block diagram of visual interpreter 36. The incoming video signal is received on video line 18b (shown in FIG. 1) and decoded by communication interface receiver 20b. The incoming video signal received at remote site 14 comprises the signal originally sent to local site 12 with possibly one or a number of icons, pointers, or other indicators overlaid onto that video signal, the particular overlay depending on the function specified by the operator. Icon extractor 60 receives the decoded video signal and determines if an icon has been overlaid onto the received video signal. If an icon has been overlaid onto the video signal, icon extractor 60 outputs an icon and the (x, y) coordinates of the icon within the video image to icon sequence interpreter 62. Icon sequence interpreter 62 receives the overlaid icon and coordinate information and generates control commands for output to device controller 38. Icon sequence interpreter 62 also provides status information to icon extractor 60 to update the status of the controlled device (in this case controllable camera base 48). Icon sequence interpreter 62 receives the status information from device controller 38.

Figure 4:
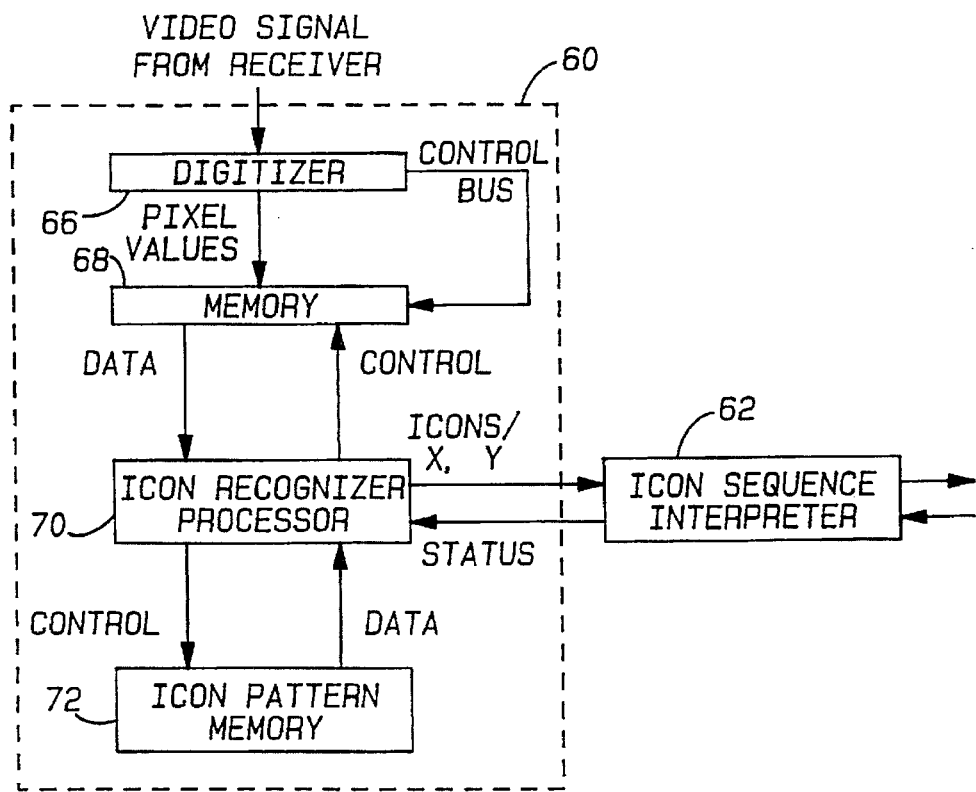
FIG. 4 is an expanded block diagram of the icon extractor shown in FIG. 3 for extracting iconic information from the video signal overlaid by the visual signaller.

FIG. 4 depicts a further expanded block diagram of icon extractor 60 and will be used to describe the detailed operation for determining if an icon has been inserted into the video stream and, if so, the position of that icon. The incoming video stream is input to the icon extractor 60 where it is digitized by digitizer 66 and stored in memory 68. Memory 68 typically stores an individual video field produced by digitizer 66. Typically, the incoming video stream is a RS-170 interlaced, analog video image stream, each field of which is digitized into a 512×512 integer array having values in the range of −127 (representing black pixels) to 128 (representing white pixels). Memory 68 is typically filled at a standard video rate of 60 fields per second. Examples of commercial off-the-shelf video image buffers include the DATACUBE system, and a personal computer compatible off-the-shelf framer grabber such as the Fidelity 200 Series Image Processing Board. It will be understood by one skilled in the art that if digital video signals are transmitted, digitization need not occur. If digital video signals are transmitted, however, digitizer 66 may perform other tasks such as rescanning the transmitted image or otherwise conditioning the digital video signal for storage in memory 68.

The digitized video image stored in memory 68 is then input to the icon recognizer processor 70. The icon recognizer processor 70 generates control signals to both memory 68 and icon pattern memory 72. The control signals indicate to the respective controlled devices that information or data should be sent to icon recognizer processor 70. In this particular example, icon pattern memory 72 stores digital representations of each icon which could be overlaid onto the video image (by visual signaller 16) and searched for by icon recognizer processor 70. The particular format for storing each icon which could be overlaid onto the incoming video stream depends on the particular method of recognition utilized by icon recognizer processor 70. In this particular embodiment, icon pattern memory 72 stores an 8×8 pattern mask of ones (1), negative ones (−1), and zeros (0). A (1) represents a high gray scale pixel value, a (−1) represents a low gray scale pixel value, and a (0) represents an area where the gray scale pixel value is unimportant for recognition. Examples of the 8×8 pattern mask is depicted in FIGS. 5a, 5b, and 5c which correspond to portions of a center icon, a pan/tilt icon, and a move icon, respectively. Note that the 8×8 mask only represents a portion of an entire icon, but may alternatively represent the entire icon if a larger mask is stored or a smaller icon is used.

Figure 6:
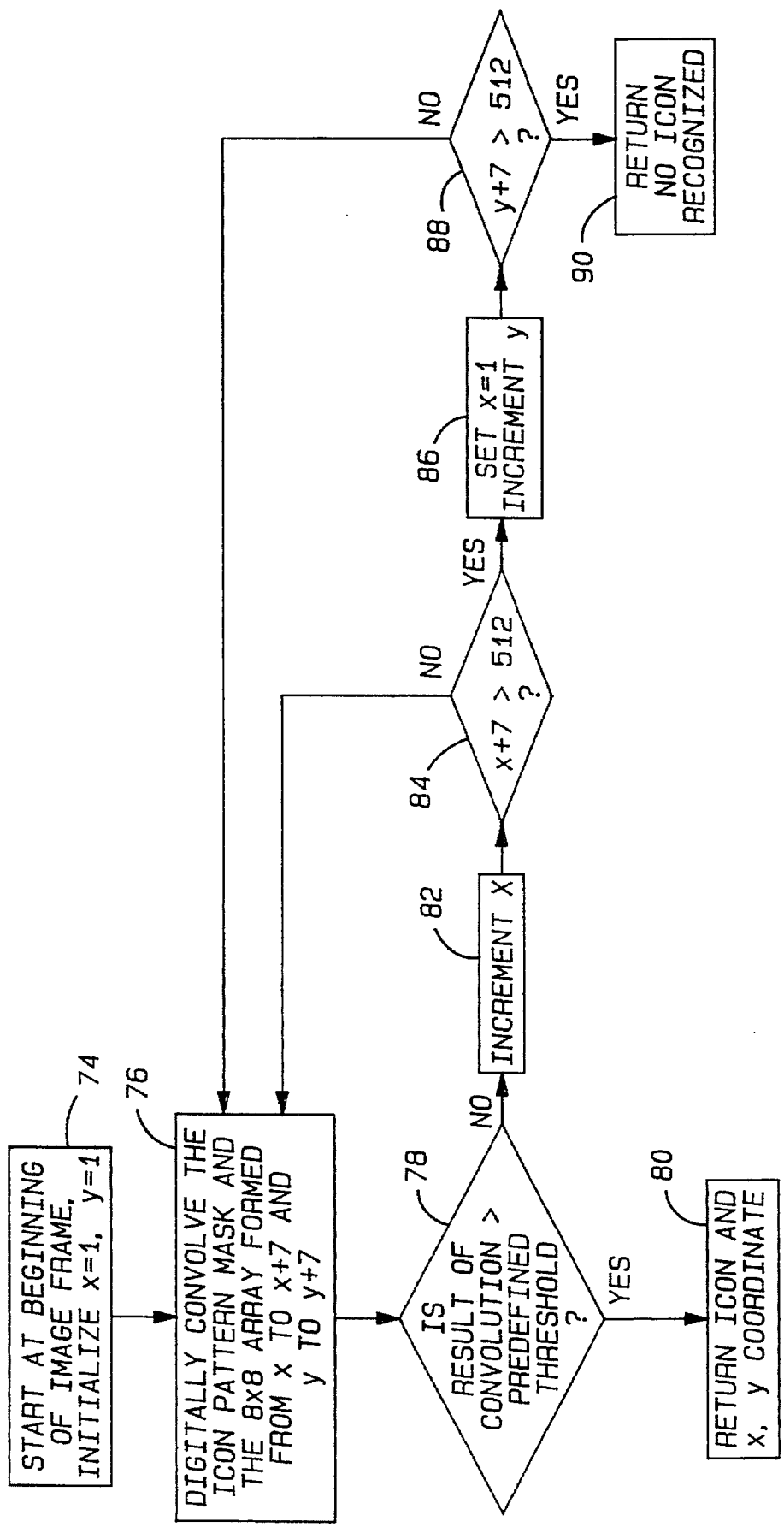
FIG. 6 is a flow diagram for comparing portions of the digitized image to the pattern masks stored in pattern mask memory.

Icon recognizer processor 70 uses a detection algorithm to determine if an icon is present in the video stream, outputs the recognized icon or icons and their location or locations in the video frame, or indicates that no icon was found to the icon sequence interpreter 62. FIG. 6 depicts a flow diagram for the icon recognizer processor 70, in the embodiment described herein, for detecting whether an 8×8 portion of the digitized image matches an icon pattern stored in icon pattern memory 72. As shown at block 74, indices x and y are initialized to 1, where x and y correspond to the horizontal and vertical coordinates of the video frame. At block 76, the icon pattern mask and the 8×8 array formed by x to x+7 and y to y+7 are convolved. To be described further with respect to FIG. 7, the digital convolution produces an integer output which is tested at block 78 to determine if the value is above a predetermined threshold. If the value is above a predetermined threshold, control advances 1.5 to block 80, where the recognized icon and (x, y) coordinates are returned and output to icon sequence interpreter 62. If the integer returned by block 76 is less than a predetermined threshold, control passes to block 82 where x is incremented and then to block 84 where the incremented value of x is tested to determine if it exceeds the number of columns in the video image. If the incremented value of x does not exceed the number of columns in the image, control is returned to block 76 where the digital convolution is repeated with a new 8×8 portion of the video image. At block 84, if the incremented value of x+7 is greater than the number of columns in the video image, x is reset to 1 and y is incremented, as shown at block 86. Control then passes to block 88 where the incremented value of y is tested to determine if it exceeds 512 (the number of rows in the video image). If the incremented value of y is less than or equal to 512, control is returned to block 76 where the foregoing steps are repeated. If the incremented value of y+7 is greater than 512, control proceeds to block 90 where program control passes to icon sequence interpreter 62 and icon recognizer processor 70 indicates that no icon was recognized.

Figure 7:
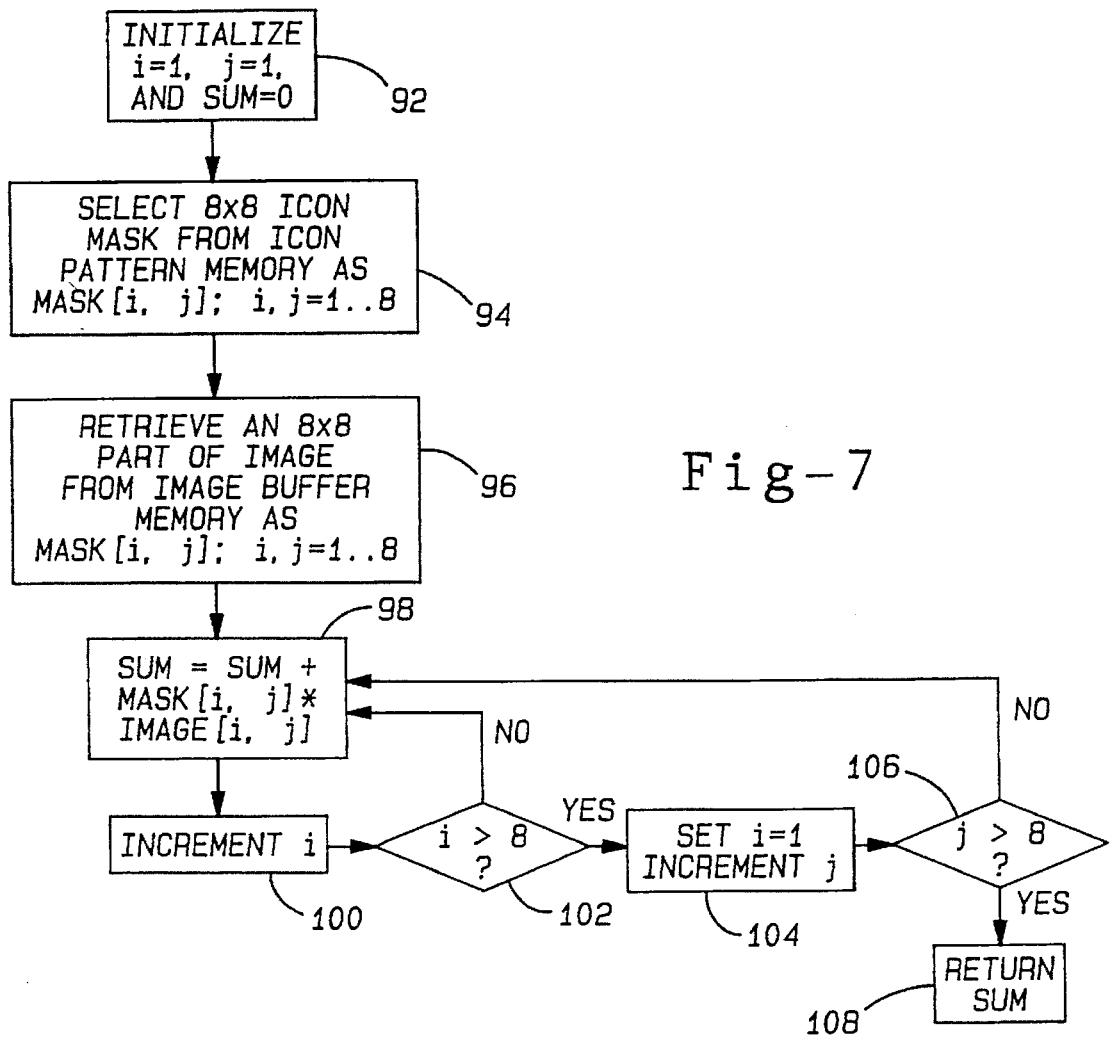
FIG. 7 is a flow diagram of the convolution performed by the icon extractor in order to determine correlations between the digitized image and the pattern mask stored in pattern recognition memory.

A flow diagram for the digital convolution occurring at block 76 is depicted if FIG. 7. In the flow diagram, the convolution occurs by selecting the 8×8 portion of the array defined by x to x+7 any y to y+7 and an 8×8 icon mask stored in icon pattern memory 72 and by performing a summation of the sum of corresponding cells in the 8×8 arrays.

At block 92, indices i and j are initialized to one and the summation value SUM is initialized to 0. Control next proceeds to block 94 where an 8×8 icon mask is selected from icon pattern memory 72 and assigned to the two dimensional array variable MASK[i,j], where i, j equals 1 to 8. Control next proceeds to block 96 where the 8×8 portion of the digital image is selected from the memory 68 in accordance with column x to x+7 and row y to y+7 as defined in block 76 of FIG. 6. This retrieved portion of the video image is assigned to two dimensional array variable IMAGE[i,j], where i, j equals 1 to 8. Corresponding cells of MASK[i, j] and IMAGE[i, j] are cumulatively added together using the variable SUM, as shown at block 98 to effect a summation of the product of corresponding cells of MASK[i, j] and IMAGE[i, j]. Control next proceeds to block 100 where the indice i is incremented and then passes to block 102 where the incremented i indice is tested to determine if it is greater than 8. If i is less than or equal to 8, control then returns to block 98 where another summation step occurs. If i is greater than 8, control then proceeds to block 104 where i is reset and the indice j is incremented. Next, j is then tested to determine if it is greater than 8 (the maximum number of rows in the portion of the video image being tested). If j is not greater than 8, control returns to block 98 where an additional summation step occurs. If j is greater than 8, all corresponding cells of MASK[i, j] and IMAGE[i, j] have been included in the convolution and control returns to test block 78 of FIG. 6, as shown at block 108.

Each convolution produces an integer value SUM defining how well each segment of the digitized, video image matched the selected icon pattern. Higher values of SUM indicate a better match. If the integer SUM returned from block 108 of FIG. 7 and tested at block 78 of FIG. 6 exceeds a predefined threshold, where that threshold depends on the particular application, the icon recognizer processor 70 indicates a match. Note that because only one icon is assumed to be present (in this particular embodiment), the first icon found is assumed to be the correct one. In a variation of this approach to icon recognition, systems in which more than one icon can be displayed at one time may digitally convolve each image portion with each possible icon and select one or a number of icons exceeding a predetermined convolution value.

Figure 8:
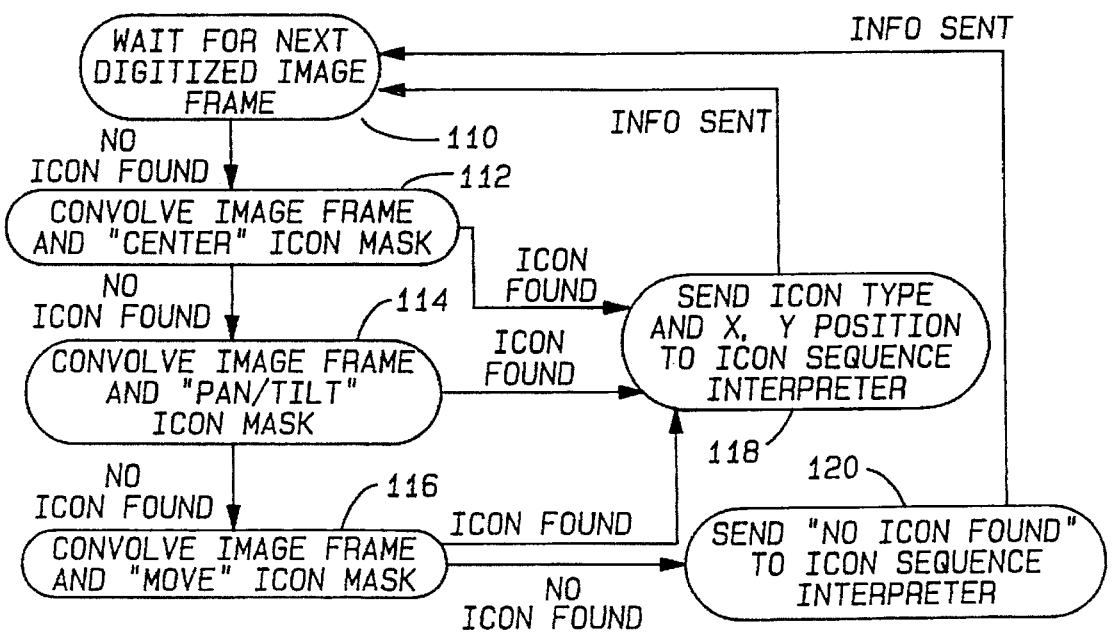
FIG. 8 is a state diagram for defining the states of the icon recognizer processor.

Because the icon recognizer processor 70 includes a state machine, the icon recognizer processor 70 can be represented as a state diagram as shown in FIG. 8. The icon recognizer processor 70 enters a wait state 110 at which control of the icon recognizer processor 70 holds until a digitized image field (a section of the digitized video image) is received. Once a digitized image field is received, the icon recognizer processor and the center icon mask (depicted in FIG. 5a) as shown at state 112 are convolved. If the convolution yields an integer value of SUM indicating no center icon, the icon recognizer processor 70 then convolves the image field and the pan/tilt icon mask (as shown in FIG. 5b). Similarly, if the convolution yields an integer value of SUM indicating no pan/tilt icon, the icon recognizer processor 70 convolves the image field and the move icon mask (depicted in FIG. 5c). In any of the center convolution 112, pan/tilt convolution 114, or move convolution 116 yields a value of SUM indicating detection of an icon, icon recognizer processor control 70 immediately outputs the icon type and the (x, y) location to the icon sequence interpreter 62 as shown at state 118 and control is then returned to wait state 110. If after the move icon mask convolution state 116, the integer value of SUM indicates that no icon is found, a no-icon-found message is sent to icon sequence interpreter 62 and control proceeds to wait state 110 where the icon recognizer processor 70 awaits receipt of a digitized image frame.

Of course, there are alternative approaches to identifying icons than the embodiment described above. For example, in an edge detection approach, a predetermined list of line segments and their geometric relationships to each other may be stored for each possible overlaid icon in icon pattern memory 72. Icon recognizer processor 70 could then use edge detection algorithms to locate images of the icons which could be overlaid. As another example, icons could be depicted as alternating bands of black and white, similar to bar codes, and icon recognizer processor 70 could then locate alternating pattern bands by searching in a linear sequence through vertical rows of pixels in the digitized image. In yet another example, in applications utilizing a computer having devices for frame grabbing, the computer could be programmed to effect the same result. If the computer had a large memory, a significant number of differing icons could be identified. All of the above described techniques are well known to those skilled in the art and it will be understood that the specific configurations for icon recognition will depend upon the design specifications and the intended application.

Figure 9:
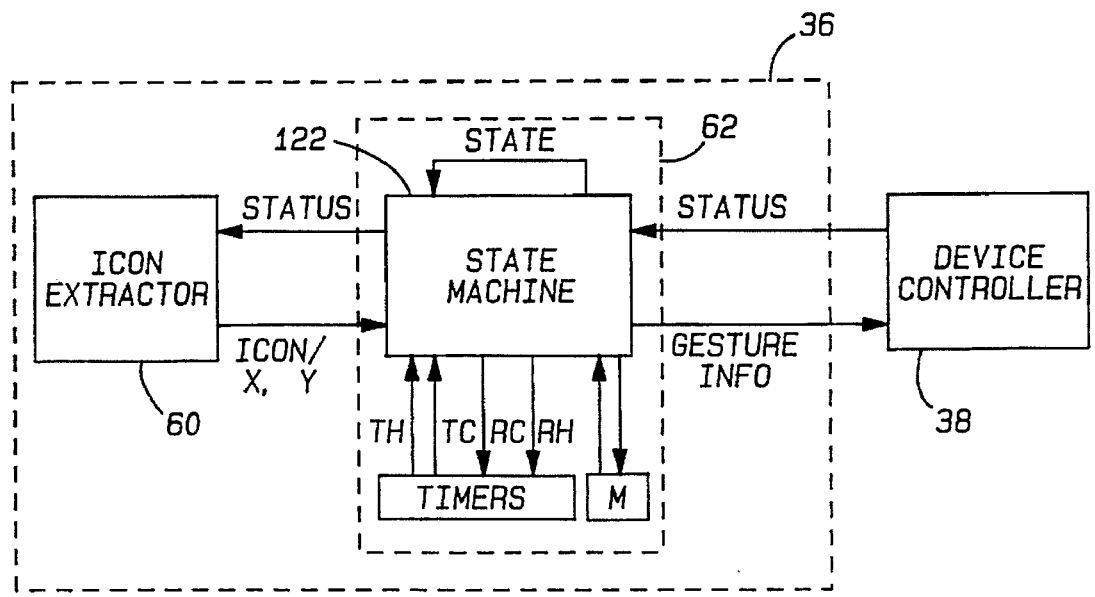
FIG. 9 is an expanded block diagram of the icon sequence interpreter depicted in FIG. 3, including a state machine, timers, and memory.

After icon extractor 60 (depicted in FIG. 3 and explained in detail with respect to FIGS. 4-8), icon extractor 60 outputs the icon recognized and the (x, y) coordinate of the icon within the video image or alternatively outputs a null signal or value to indicate that no icon was found in the digitized video image. Icon sequence interpreter 62 receives the output signal from icon extractor 60 and generates control commands output to device controller 38. In FIG. 9, an expanded block diagram of icon sequence interpreter 62 includes state machine 122, timer block 124, and memory 126. State machine 122 outputs various gesture info, including (x, y) coordinates and information about particular icons recognized, to device controller 38. Device controller returns acknowledgement signals to state machine 122 via the status line interconnecting the two. Timer block 124 provides timer signals to state machine 122 in the form of a timer hold (TH) and a timer clear (TC) control signal and receives timer control information signals from state machine 122 in the form of reset clear (RC) signal and reset hold (RH) control signals, all of which will be described in detail herein. State machine 122 also includes a line for state feedback, defined as the state line in FIG. 9.

In operation, state machine 122 follows a predetermined sequence from one state to a succeeding, where state changes occur in response to receiving a particular input while in a particular state. Operation of state machine 132 can best be understood by referring to the state diagram of FIG. 10 and the state or transition table of FIG. 11, which will be used to present a detailed example of the operation of state machine 122.

Figure 10:
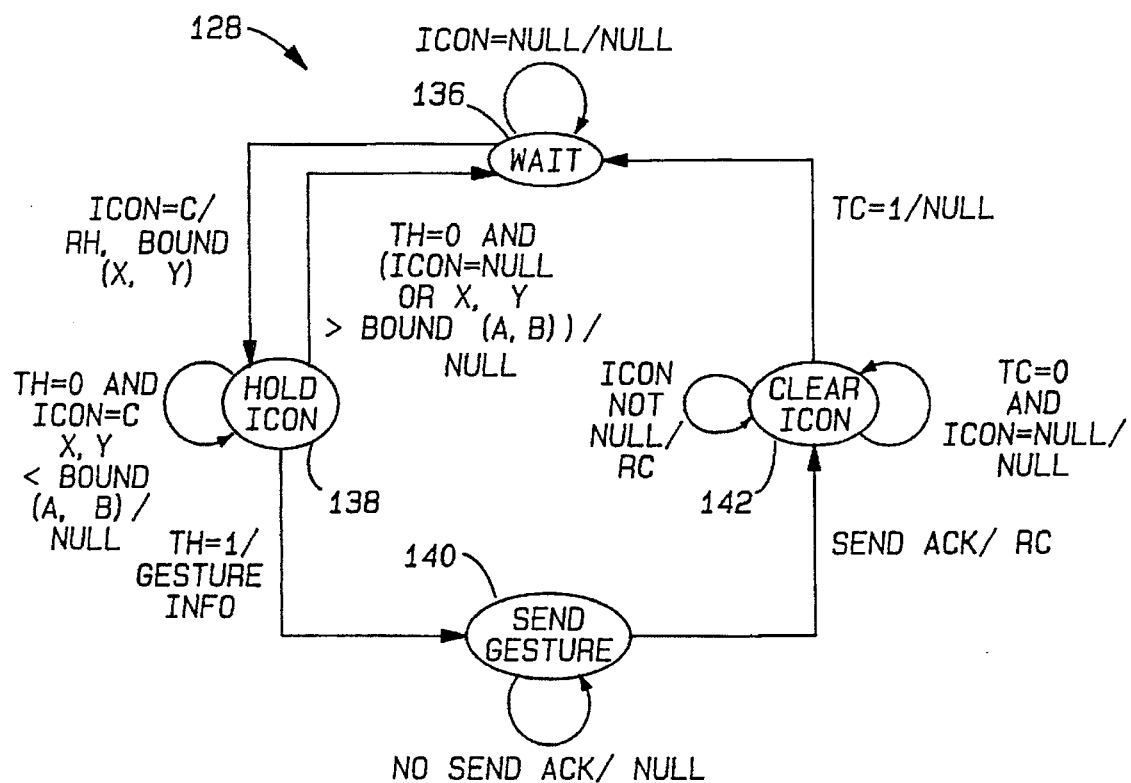
FIG. 10 is a state table defining the states of the state machine FIG. 9 for executing a centering command.

By way of background to the operation of icon sequence interpreter 62 and, more particularly, state machine 122, a brief discussion of the desired operation of the remote control system 10 will clarify the following description of FIGS. 10 and 11. There are four primary operations to carrying out operator directed remote control pointing. First, the state machine 122 remains in effect dormant while waiting for input from icon extractor 60 which indicates that the operator has provided inputs through visual signaller 16 to effect a desired adjustment in the positioning of camera 32. Once state machine 122 receives an operator generated input, state machine 122 enters a hold state which requires that a predetermined time period must lapse before proceeding to output gesture info to device controller 38 to effect adjustment of camera 32. The lapse of the predetermined time period enables state machine 122 to insure that the operator has indeed requested a specified input. After the lapse of the predetermined time period and assuming that the operator input has continued for the predetermined time period and the cursor remains within a predetermined region for the time period, state machine 122 then outputs the gesture information to device controller 38 to effect movement of the camera 32. If during the predetermined time period, the user input changes, state machine 122 returns to a wait state under the assumption that the operator has not specifically requested an adjustment of camera 32. If the predetermined time period does lapse successfully and the operator input has not changed, the gesture information is output to device controller 38. Following receipt of acknowledgement from device controller 38 that the gesture information has been received and the requested operation has been carried out, state machine 122 enters a clear icon state. The clear icon state provides a waiting state which allows the user to view visually that the user-requested operation has occurred at the remote site and to remove the icon. Then, once again, a predetermined time period must lapse before state machine 122 proceeds to the next state in order to insure that a sufficient amount of time has been provided to distinguish between a jittery false removal and an actual icon removal. Following the clear icon state, control typically returns to the original wait state where state machine 122 awaits additional external input. Further, note that the timers TH and TC define the predetermined time lapse required by state machine 122 to insure that the user has indeed requested an adjustment of camera 32 and to insure that the time that state machine 122 properly delays receiving additional input to insure that the operator notices that the camera 32 has been repositioned, respectively.

Figure 12A:
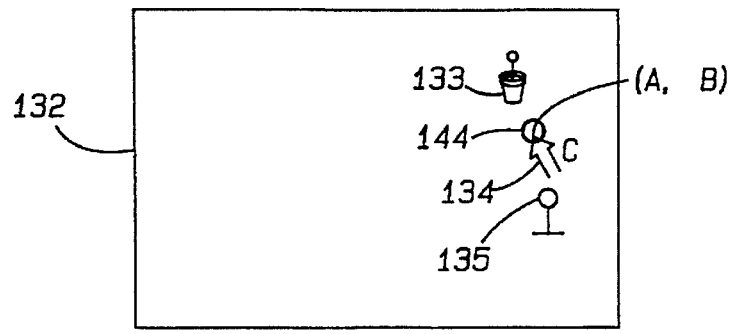
FIG. 12a and 12b are examples of the change in the view area upon executing a centering command.
Figure 12B:
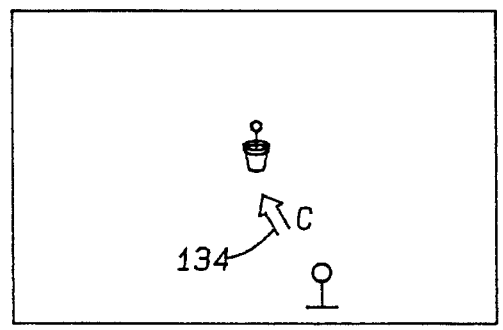

As an example, state diagram 128 of FIG. 10 and transition table 130 define the transitions for state machine 122 for a centering operation for camera 32. Referring to FIGS. 12a and 12b, an example of the centering operation will be described herein. In FIG. 12a, view area 132 represents a typical display seen by the operator on monitor 28 as captured by camera 32. The scene comprises simply an object 133 near the right upper portion of view area 132 and a second object 135 towards the bottom right portion of view area 132. In order to effect a centering operation, the operator uses icon selector 26b of visual signaller 16 to select centering icon 134. The operator would then use graphics locator pad 26a to manipulate centering icon 134 to point to object 133. When centering icon 134 has pointed at object 133 for a sufficient time period and remains within a sufficiently localized region, state machine 122 outputs the gesture information to device controller 38 which generates commands to manipulate the base 48 of camera 32 in order to center object 133 as shown in FIG. 12b.

State diagram 128 and transition table 130 provide the state information describing operation of state machine 122 center the object pointed to by centering icon 134. State machine 122 initially remains in WAIT state 136 so long as the icon information received from icon extractor 60 indicates a null icon (no icon detected). When other than a null icon is received, a state transition from WAIT state 136 to HOLD ICON state 138 occurs. Upon this state transition, state machine 122 outputs to memory 126 the result of the BOUND(a, b) function, where defines a radius around the tip of the arrow portion of centering cursor 134, which is positioned at coordinate (as can be seen in FIG. 12a). The BOUND(a, b) function defines a region 144 centered at (a, b) (seen in FIG. 12a in phantom) which defines an area in which the pointer of the arrow portion of center icon 134 must remain before state machine 122 outputs the particular gesture information to device controller 38 to effect a move operation. Once in the HOLD ICON state 138, timer hold TH=0 is initiated to count a predetermined time lapse. As can be seen in the HOLD ICON row of FIG. 11, if while in the hold icon state 138, timer hold TH=0 and either icon information received from icon extractor 60 equals null or the (x, y) position of centering cursor 134 is not within the BOUND(a, b) function, control returns to WAIT state 136. While in the HOLD ICON state 138, if timer hold TH=0 and the icon is the centering icon and the newly received (x, y) positions are within the BOUND(a, b) function control returns to the HOLD ICON state 138. Once the timer hold TH=1, meaning that the centering icon has stayed within the BOUND(a, b) for a sufficient time, gesture information is output to device controller 38 and control passes to the SEND GESTURE state 140. The gesture information typically includes the (x, y) coordinate of the icon, the function to be carried out, and a second set of (x, y) coordinates if required by the particular function to be effected. In the case of the centering operation, the center function request and the position of the centering icon need only be sent to device controller 38. As can be seen in state diagram 128 of FIG. 10 and the row entitled SEND GESTURE of FIG. 11, control remains in the SEND GESTURE state 140 while no send acknowledge has been received back from device controller 38. While in the SEND GESTURE state 140 and no send acknowledge has been received from device controller 38, state machine 122 waits for a send acknowledge signal. After device controller has returned a send acknowledge to state machine 122, control passes to CLEAR ICON state 142, and state machine 122 outputs a reset clear RC signal in order to reset timer clear TC=0. When in the CLEAR ICON state 142, so long as TC=0 and icon equals null (no new icon information has been received) control remains in CLEAR ICON state 142. Once timer clear TC=1, indicating that a sufficient time period has lapsed so that control returns to WAIT state 136, and state machine 122 awaits additional command information from icon extractor 60. If state machine 122 receives icon information from icon extractor 60 while in the CLEAR ICON state 142, control remains in CLEAR ICON state 142, and, state machine 122 outputs a reset clear RC signal to timer block 124 in order to reset the timer clear TC=0. In this manner, no new iconic information can be processed until the timer clear TC=1 and no new iconic information has been received.

As described above, state diagram 128 of FIG. 10 and transition table 130 of FIG. 11 convey substantially the same information. However, transition table 130 also conveys information related to the output of state machine 122. It will be readily understood by one skilled in the art that such output information could easily be incorporated into state diagram 128 of FIG. 10. Typically, the inputs which define the state transitions are followed by a delimiter (/) and the outputs are then provided as well. Such information can be evidenced with reference to the state transitions from SEND GESTURE state 140. It should be noted that for purposes of simplicity and to limit duplicity, only the state transition tables will be depicted when disclosing specific operation of state machine 122 herein.

Figure 13:
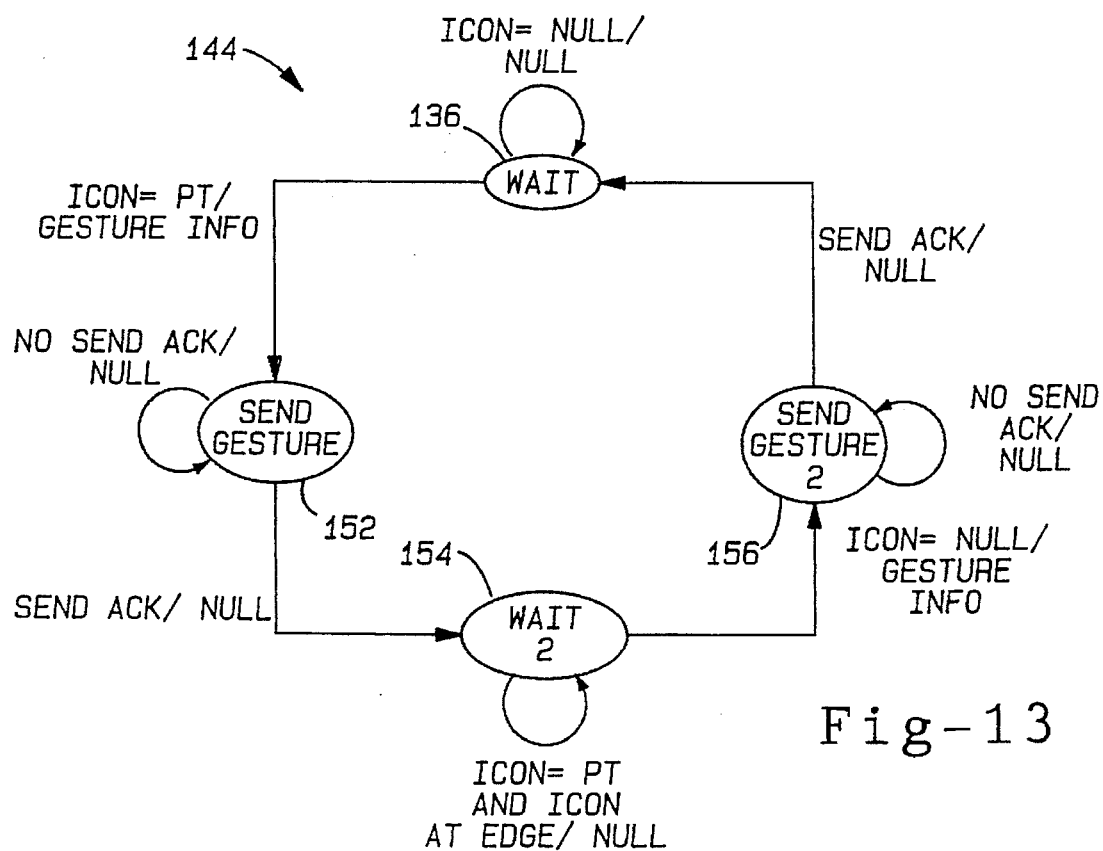
FIG. 13 is a state diagram defining the states of the state machine of FIG. 9 for executing a pan/tilt command.
Figure 14:
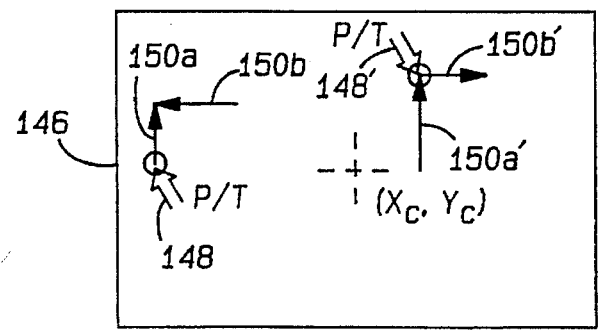
FIG. 14 is an example of the view area of the monitor displayed when executing a pan/tilt command.

In another possible operator directed operation, the operator could request that the base 48 manipulate the camera 34 in a horizontal pan direction and/or a vertical tilt direction to effect a panning/tilting of camera 34 in order to scan a viewing area. FIG. 13 depicts a state diagram 144 for effecting the panning/tilting operation. Before fully describing the operation of the panning and tilting state transition portion of state machine 122, reference to FIG. 14 provides an explanation of the panning/tilting operation. Viewing area 146 demonstrates a representative viewing area of the image captured by camera 32 with pointer or icon information overlaid thereon. Viewing area 146 has a center (Xc, Yc) which defines the center of the viewing area of camera 32. Also shown in view area 146 is a first pointer 148 and/or a second pointer 148' which will be used to demonstrate the result of the panning and tilting operations. Note that in operation only one pointer 148 or 148' typically appears in view area 146 when executing a pan/tilt command. Assuming that the operator has positioned pointer 148 as shown (using the icon selector 26b to select the icon which defines the operation and the graphics locator pad 26a to position the icon), the device controller 38 generates pan/tilt commands to displace controllable camera base 48 at a rate in accordance with the distance from the center (Xc, Yc) of viewing area 146. That is, the pan or tilt speed is a function of the distance from the center of the view area 146 such that the pan rate=F(X1−Xc) and the tilt rate=F(y1−Yc), where (x1, y1) are the coordinate of the pan/tilt icon 148 (or 148'). Thus, for pointer 148, the pan and tilt rate are demonstrated vectorially by vectors 150a and 150b, where vector 150a represents the tilt rate in a vertical direction and vector 152b represents the pan rate in a horizontal direction. Vectors 150a and 150a' and 150b and 150b' include a length and direction that demonstrates the effect of the positioning of the pan/tilt icon 148 with respect to center (Xc, Yc) on the overall pan and tilt rate. Controllable camera base 48 pans at a greater rate for pan/tilt icon 148 than for pan/tilt icon 148' because pan/tilt icon 148 is further from center (Xc, Yc). Similarly, the base 48 tilts at a much higher rate for icon 148' than for icon 148.

Returning to FIG. 13, state diagram 144 describes the operations of state machine 122 to enable pan/tilt operation. At WAIT state 136, which is the same wait state as depicted in FIG. 10 but is responsive to inputs other than those depicted in FIG. 10. In WAIT state 136, if the icon received by state machine 122 from icon extractor 60 is null, a transition back to WAIT state 136 occurs and a null value is output. When the pan/tilt icon PT is received by state machine 122, a transition to SEND GESTURE state 152 occurs and the gesture information is output by state machine 122 to device controller 38. The gesture information would be one of the (X,Y) horizontal or vertical coordinates, respectively, of the pan/tilt icon to effect pan or tilt depending on the particular coordinate provided. In SEND GESTURE state 152, an input of no send acknowledge causes a transition back to SEND GESTURE state 152 and state machine 122 outputs a null output. If a send acknowledge is received, a null output is generated and a transition to WAIT 2 state 154 occurs. In WAIT 2 state 154, an input of icon equals PT causes a transition back to WAIT state 154. An input of icon equals null causes a transition to SEND GESTURE 2 state 156 and an output of gesture info to device controller 38. Similarly to SEND GESTURE state 152, a no send acknowledge causes a transition back to SEND GESTURE 2 state 156 and an output of null. The gesture info output during transition to SEND GESTURE 2 state 156 comprises the other of the x, y coordinates than that sent during transition to SEND GESTURE state 152. This effects the other of the panning or tilting operations which resulted from the gesture information sent during transition to SEND GESTURE 152. An input of send acknowledge to SEND GESTURE 2 state 156 causes a transition back to wait state 136 where the same state transition sequence would be repeated.

Figure 15:
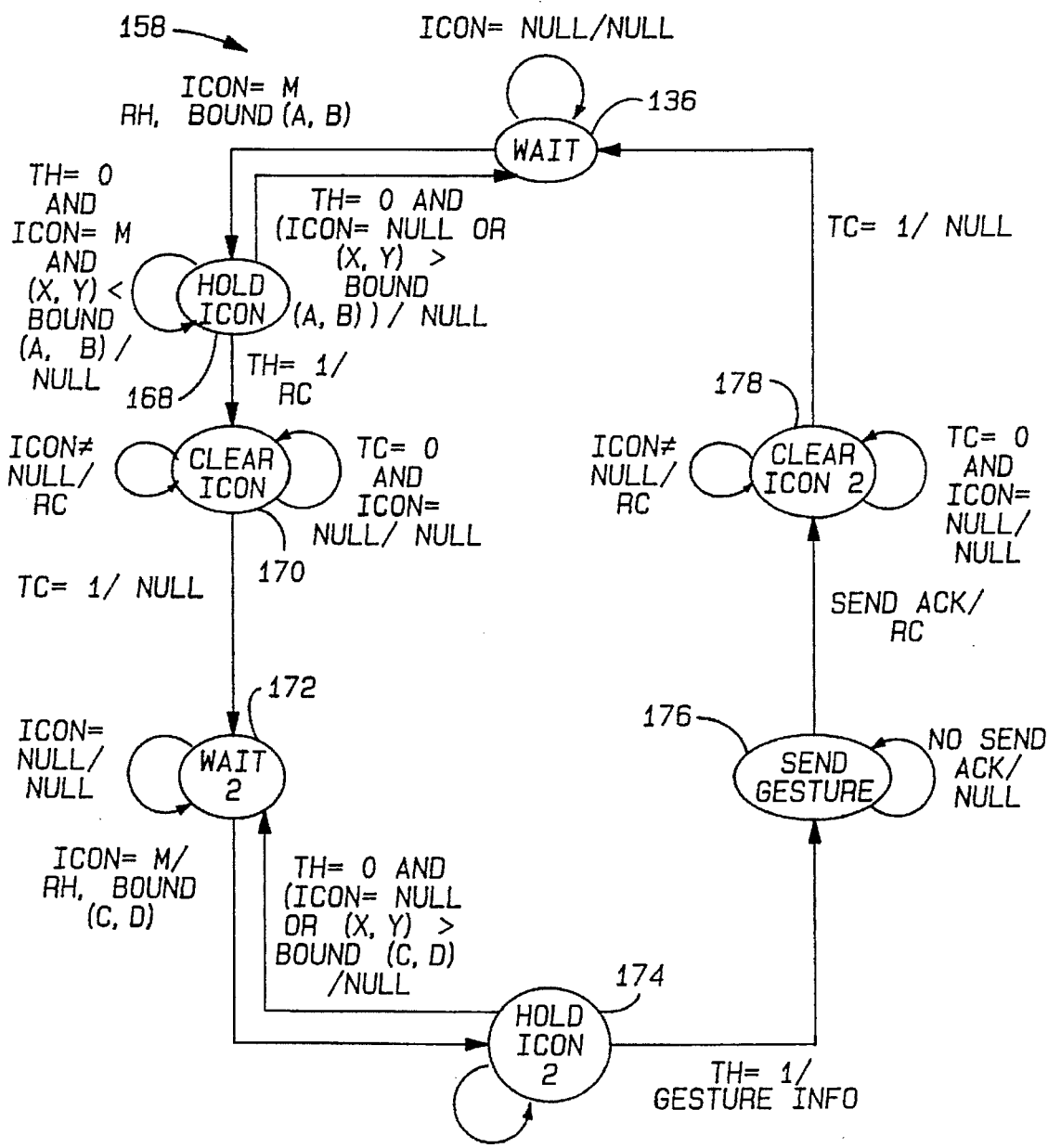
FIG. 15 is a state diagram defining the states of the state machine of FIG. 9 for executing a move command.
Figure 16A:
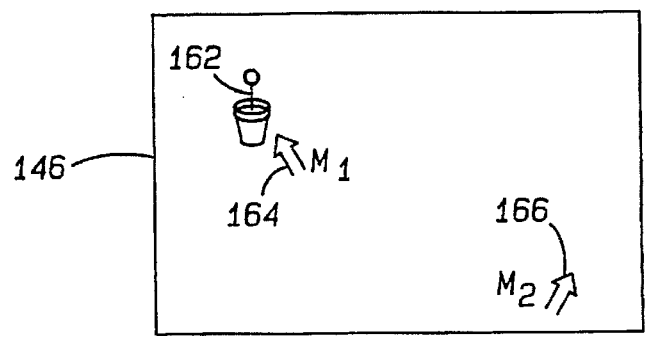
FIGS. 16a and 16b are examples of the view area of the monitor displayed when executing a move command.
Figure 16B:
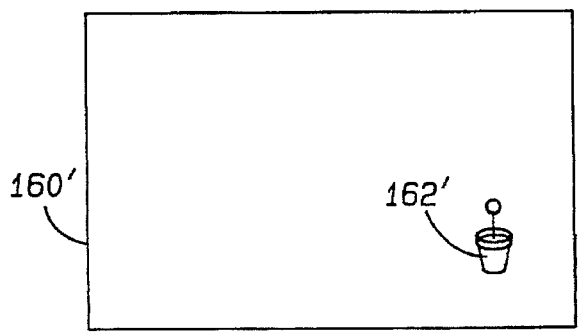

In yet another operation, FIG. 15 depicts a state diagram for a state transition table 158 for effecting a move operation as demonstrated in FIGS. 16a and 16b. In the move operation, objects appearing in the viewing area 160 of FIG. 16a may be moved from one position in the viewing area to another position in the viewing area. For example, in FIG. 16a an object 162 may desirably be moved from its current position to a position in the lower right corner of view area 160 (as referenced by move cursor M2). To effect a move operation, the operator positions the move icon 164 (M1) using the graphics locator pad 26a and selects a move icon M1 164 using the icon selector 26b to select a starting point for the move operation. The operator next uses the graphics locator pad 26a to manipulate a pointer to a position of the viewing area to which the object 162 is to be moved. After the pointer has been positioned, the operator uses icon selector 26b to select a second move icon 166 (M2). The state machine 122 then generates transition commands to displace controllable camera base 48 to position the object 162 in the area of the screen referenced by move icon 166 (M2). This can be seen in viewing area 160' of FIG. 16b where object 162 is now repositioned as object 162'.

Referring to state transition table 158, state machine 122 is initially in WAIT state 136 which may be the same as the wait state similarly described with respect to FIGS. 10 and 13. While in wait state 36, an input of a null icon results in a transition back to wait state 136 and an output of null. An input of a move icon (M1 or M2) causes a transition to HOLD ICON state 168 and causes state machine 122 to reset the hold timer by generating an RH signal and a BOUND (a,b) function. The BOUND(a,b) function operates as described with respect to FIGS. 10 and 11, and the coordinates (a,b) correspond to the (x,y) coordinates defining the position of icon 164 (M1). While in the HOLD ICON state 168, an input of timer hold TH=0 and a null icon or (x,y)>BOUND(a,b) causes a transition back to WAIT state 136. While in HOLD ICON state 168 with the timer hold TH=0, a move icon M1 input, and (x,y)<BOUND(a,b) causes a transition back to HOLD ICON state 168. When the timer hold TH=1 (indicating that a sufficient lapse of time has occurred), a transition to CLEAR ICON state 170 occurs and state machine 122 outputs a reset clear signal RC to timer block 124 to clear the reset clear RC timer. While in CLEAR ICON state 170, an input of icon not equals null causes a transition to CLEAR ICON state 170 and causes state machine 122 to output a reset clear timer signal RC to timer block 124. An input of timer clear TC=1 and a null icon also causes a transition back to CLEAR ICON state 170 and an output of null. An input of timer clear TC=1, causes a transition to WAIT 2 state 172. Note that states 168 through 172 enable the user to select the initial coordinates of the viewing area (160 as shown in FIG. 16a) to be moved to a second location to be thereafter selected.

WAIT 2 state 172 responds to inputs as described with respect to wait state 136 except the BOUND(c,d) function has inputs which correspond to the x,y coordinates of the position to which movement is to occur (defined by move icon 166 (M2) in FIG. 16a). A transition from WAIT 2 state 172 typically occurs to HOLD ICON 2 state 174. Inputs to HOLD ICON 2 state 174 cause state transitions similarly as described with respect to HOLD ICON state 168 as previously described herein. An input of timer hold TH=1 causes a transition to SEND GESTURE state 176 and an output of gesture info to device controller 38. This gesture info includes the move command, the coordinates of the starting position of the move, and the coordinates of the end position of the move. In SEND GESTURE state 176 an input of no send acknowledge causes a transition back to SEND GESTURE state 176 and an output of null. If a send acknowledge input is received, a transition occurs to CLEAR ICON state 178. An input of null icon causes a transition back to CLEAR ICON state 178 and an output of RC to reset the clear timer. Further, an input of timer clear TC=0 and a null icon causes a transition back to CLEAR ICON state 178 and causes an output of null from the state machine 122. When the timer clear TC=1, a transition from CLEAR ICON state 178 to WAIT state 136 occurs and a null value is output. Note that with respect to HOLD ICON 2 state 174 through CLEAR ICON state 178, the state transition is similar to state transitions 138 through 142 for the centering operation depicted in FIG. 10. In this manner, state transitions 174 through 178 provide a user interface and insure that the user has requested the move then insures that the user has opportunity to observe that the move has occurred before accepting additional input.

Of course, it will be understood by one skilled in the art that the above defined movements are easily extendable to any of a number of possible movements and are constrained only by the particular application requirements or needs of the user. Further, it will be understood by one skilled in the art that the visual signaller 16 may be easily adaptable to provide commands to the visual interpreter 36 which direct the state machine 122 to store in memory 126 icons received from visual signaller 16 and the commands associated therewith for outputting the gesture information to effect the command. In this manner, the remote site need not be implemented to interact with any one of a plurality of possible local sites 12. That is, a plurality of local sites 12 could communicate with a remote site 14 and provide visual command information to direct the movement of camera 32 to base 48. Such interaction may be limited to communication with one site at any given time or multiplex communication may be easily effected so that with a suitable arbitrator (not shown), a plurality of local sites 12 could provide visual command information to direct the movement of base 48. Such multiplexing is well known in the art.

Figures 17, 18:
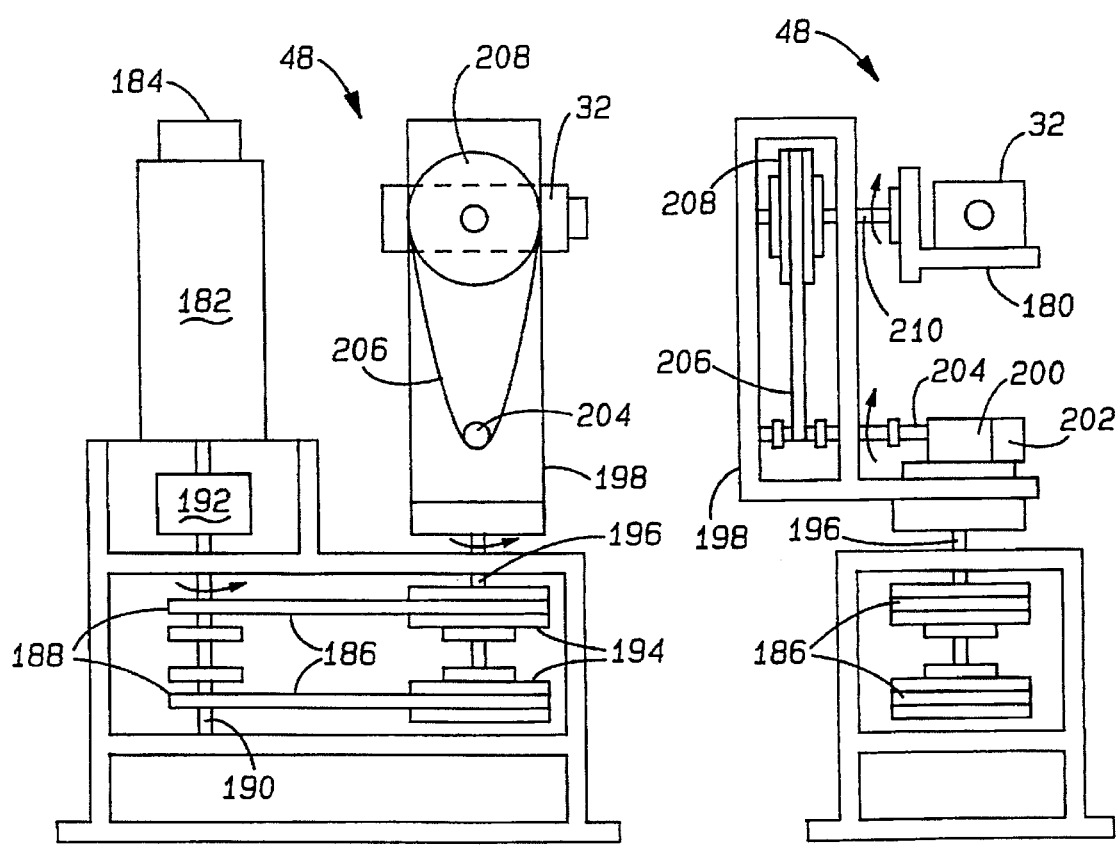
FIG. 17 is a side view of the controllable camera base for holding the camera and shows a detailed view of the drive arrangement for the pan motor.
FIG. 18 is a front view of the controllable camera base for holding the camera and shows a detailed view of the drive arrangement for the tilt motor.

The icon sequence interpreter 122 of visual interpreter 36 outputs gesture information to device controller 38. The device controller 38 in turn outputs signals on control lines 44a, 44b, and 44c to effect movement of controllable camera base 48 in a predetermined direction and at a predetermined rate. FIGS. 17 and 18 present a side and a front view of an exemplary controllable camera base 48. As described above, camera base 48 includes camera 32 mounted to a camera support 180. Manipulation of camera 32 is accomplished through two motors. The first motor is pan motor 182. Pan motor 182 includes an encoder which sends positional information to device controller 38. Pan motor 182 connects to a pair of drive belts 186 which are driven by a pair of drive pulleys 188 connected to an output shaft 190 from pan motor 182. Output shaft 190 may optionally be driven through a gear reduction set 192. Drive belts 186 in turn attach to driven pulleys 194 so that movement of drive belts 186 cause movement of driven pulleys 194. Driven pulleys 194 are in turn connected to pan shaft 196 such that movement of pan shaft 196 causes movement of pan support 198 to which camera support 180 and camera 32 are mounted.

To effect a tilting movement of the camera, a second, tilt motor 200 receives control signals through the control lines. Encoder 202 encodes positional information regarding tilt motor 200 which is received by device controller 38. Operation of tilt motor 200 causes movement of output shaft 204 which causes movement of tilt belt 206. Tilt belt engages output shaft 204 such that movement of output shaft 204 causes a corresponding movement of tilt belt 206. Tilt belt 206 engages driven pulley 208. Driven pulley 208 engages tilt shaft 210 such that movement of tilt shaft 210 causes a corresponding up and down tilting motion of camera support 180. Thus, camera base 48 moves in two degrees of freedom, pan and tilt. Pan motor 182 and tilt motor 200 are typically DC servo motors. Pan motor 182 and tilt motor 200 include encoders 184 and 200, respectively, to provide control information to device controller 38 so that device controller 38 can determine the current position of the camera with respect to its pan and tilt angles. Controllable camera base 48 may also include limit switches (not shown) to provide end stop information to device controller 38, which also enables initial positioning of controllable camera base 48 in a neutral pan and tilt position (i.e., no pan or no tilt). In order for device controller 38 to effect control of pan motor 182 and tilt motor 200, device controller 38 must have stored in memory various camera parameters 32 and controllable camera base 48 parameters so that the proper commands can be generated.

FIG. 19 depicts an expanded block diagram of device controller 38. Device controller 38 receives controller task commands on input line 210a and returns status information to visual interpreter 36 on status line 210b. The control information is received by and the status information generated by a reference trajectory generator 212 which converts the gesture information received on line 210a into a motion path for each motor. The motion paths are then implemented in a proportional and derivative (PD) loop controller 214. The PD loop controller 214 outputs torque commands to pan motor 182 on control line 216b and receives status information to PD controller 214 on status line 216b. Similarly, PD loop controller 214 provides torque commands to tilt motor 200 on control line 218 and receives status information from tilt motor 200 on status line 218b.

Reference trajectory generator 212 provides information to PD loop controller 214 in terms of a motor position and velocity at which the PD loop controller 214 is to position the respective pan motor 182 and tilt motor 200. This information is input to PD loop controller 214 on control line 220a, and PD loop controller 214 returns positioning information to reference trajectory generator 212 on status line 220b. In order for reference trajectory generator 212 to define a motion path in terms of motor positions which PD loop controller 214 may track, reference trajectory generator 212 requires input from both camera 32 and controllable camera base 48. From camera 32, the reference trajectory generator 212 may receive information regarding the zoom factor, focal length, lens parameters and any other additional information related to the view field of camera 32. From controllable camera base 48, reference trajectory generator 212 must receive information related to the type and length of joints, gear ratios, and any other kinematic information which effects the positioning of controllable camera base 48. Further, as already described previously herein, reference trajectory generator 212 also receives (x, y) coordinate information and icon information or other gesture information from visual interpreter 36.

As a brief example of such kinematic motion, if the operator has requested a move operation as described with respect to FIGS. 15 and 16, two (x, y) coordinates are received from the visual interpreter in addition to a move icon. The (x, y) coordinate information is converted into a change in the pan and tilt angles of the controllable camera base 48 through a function based on the focal length and zoom factor of camera 32 and the kinematic structure of controllable camera base 48. The reference trajectory generator 212 calculates new pan and tilt angles, and a line representing the reference trajectory is interpolated based on the current pan and tilt angles and the desired pan and tilt angles. This line is used by PD loop controller 214 as a reference to follow in generating commands for the pan motor 182 and tilt motor 200.

The reference trajectory line used by PD loop controller 214 to provide torque commands to pan motor 182 and tilt motor 220 represent a desired motor position and rate of change. The encoders 184 and 202 provide status information on status lines 216b and 218b, respectively. PD loop controller 214 uses this information to implement a proportional and derivative feedback control system and output torque commands which cause pan motor 182 and tilt motor 200 to move at a desired velocity to the predetermined position in accordance with the error between the current and desired position and velocity.

It will be understood by one skilled in the art that all point to point motion may desirably be completed in a predetermined, constant time period. However, operators may be provided an option of selecting specific icons to vary the predetermined time rate from point to point motion. It will be further understood by one skilled in the art that other control schemes may be implemented as well, such as inverse dynamics control for more complicated systems or simpler positional commands based on stepper motor control of camera base 48, such as when using a Canon VC-C1 Robotic camera and base.

Referring to FIG. 20, a simplified block diagram of that depicted in FIG. 1 will be used to describe an additional possible remote control function. Note that in FIG. 20 and throughout the specification like elements will be numbered similarly to those elements already referenced. In FIG. 20, camera 34 captures the image of a person 222 which is displayed on monitor 28 as 222'. Also shown in the view area of monitor 28 is a 4-point cursor 224 which will be used to define an additional function implementable in the remote visual control apparatus. Cursor 224 defines a zoom function described herein, for manipulating the zoom properties of camera 34. Note that in addition to the zoom function described herein, the visual interpreter 36 and device controller 38 may also implement the functions previously described as well. In operation, the distance of zoom cursor 224 from the center of monitor 28 viewing area defines the zoom magnification for camera 34. As center icon 224 is moved by the operator using the icon positioner 26a of visual signaller 16 from the outer edge towards the center of the viewing area of monitor 28, zoom property 226 is increased to zoom-in. Similarly, if zoom icon 224 is moved from the center towards an outer edge, the zoom property 226 of camera 34 is decreased to effect a zoom out. It will be understood by one skilled in the art that other controllable features of camera 34, such as white balance or recording features, could be commanded similarly.

Figure 21:
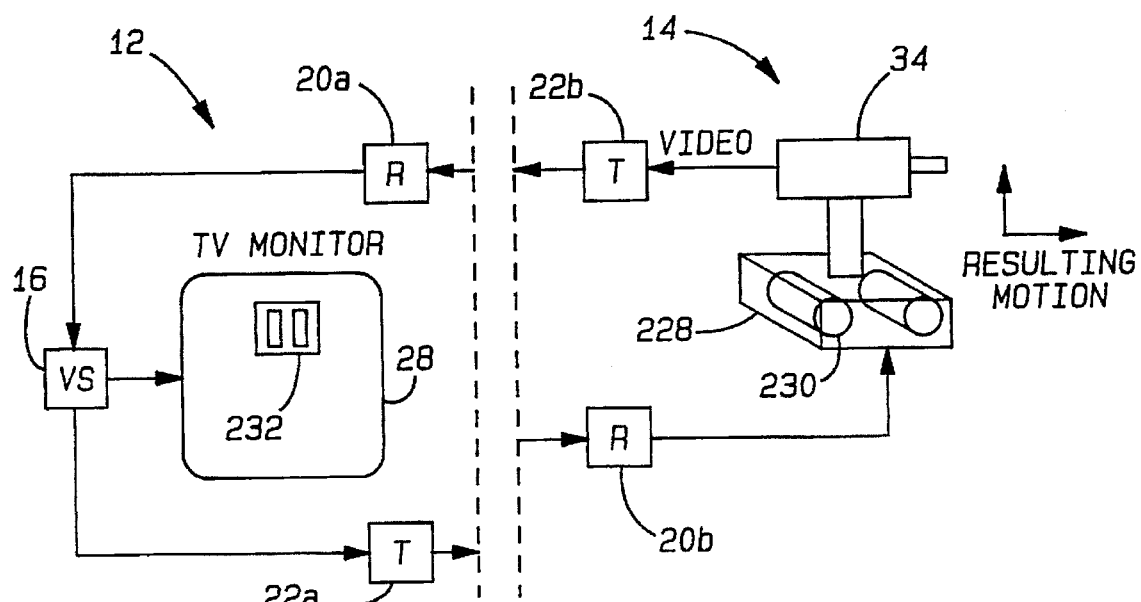
FIG. 21 depicts a mobile camera base which translates across the surface on which the base rests and which has an integral visual interpreter and device controller.

In an alternative embodiment, FIG. 21 depicts a move function having a controllable camera base 228 that translates across its supporting surface in both a forward, reverse, right, and left direction by means of wheels 230. Referring to FIG. 21, monitor 28 displays in its viewing area a camera base move icon 232. Controllable camera base 228 of FIG. 21 integrally includes visual interpreter 36 and device controller 40, shown separately in FIG. 1. Further, controllable camera base 228 operates as described earlier with respect to centering, pan/tilt, move and other operations and further includes wheels 230 which enables translation across the supporting surface for controllable camera base 228, so that controllable camera base 228 translates in a forward, reverse, right, and left direction. Referring to monitor 28, when the operator positions the move icon 232 to the top, center of the monitor 28 viewing area, the controllable camera base 228 translates in a forward direction. Similarly, when the operator positions move icon 232 in the bottom center of monitor 28 viewing area, controllable camera base 228 translates in a reverse direction. Similarly, if the operator positions the icon in the vertical center of the screen to the far left or far right edge of the monitor 28 viewing area, controllable camera base 228 translates in a left and right direction, respectively. Further, various combinations of left, right, fore, and aft motions can be combined to provide diagonal movements. Further yet, various other icons could be selected to select the final destination or rotate controllable camera base 228, or telescopically raise and lower the camera with respect to controllable camera base 228.

Figure 22:
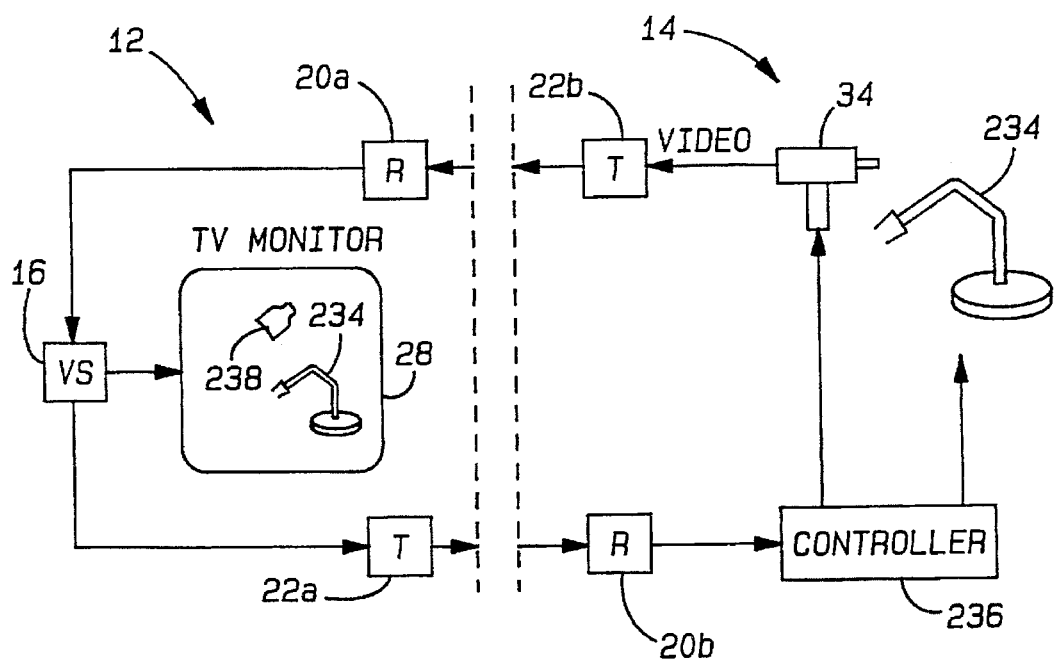
FIG. 22 depicts a robot arm and a camera which are both controlled by an integral visual interpreter and device controller.

In yet another embodiment of the present invention, FIG. 22 depicts an implementation including a controllable robot arm 234. In this embodiment, the visual interpreter 36 and device controller 38 have been integrally combined into controller 236. The operator then uses visual signaller 16 to manipulate not only camera 34 but robot arm 234 as well. For example, the operator can use the cursor within the viewing area of monitor 28 to select a point in the remote viewing area to which remote arm 234 should be adjusted. Controlling the robot arm 234 demonstrates the depth of this invention and the potential application of the iconic gestural commands to more complicated systems having greater degrees of freedom, such as the robot arm 234. The visual signaller 16 is thus capable of interpreting a variety of iconic gestural commands decipherable by a visual interpreter and device controller combination. For example, a move gesture typically applicable to controllable camera base 48 described herein, may be equally applicable to controlling the robot arm 234 so long as visual interpreter has been preprogrammed to recognize and apply iconic information similar to the iconic gesture for the move command to control signals for the robot arm 234. Thus, so long as the visual interpreter (36 of FIG. 1, for example) and device controller (38 of FIG. 1, for example) are configured to transform the gesture information into appropriate control commands, the visual signaller 16 at the local site 12 can control the device to be controlled at the remote site 14. Of particular importance, is that the visual signaller 16 need not be specifically programmed to control the device at the remote site.

Figure 23:
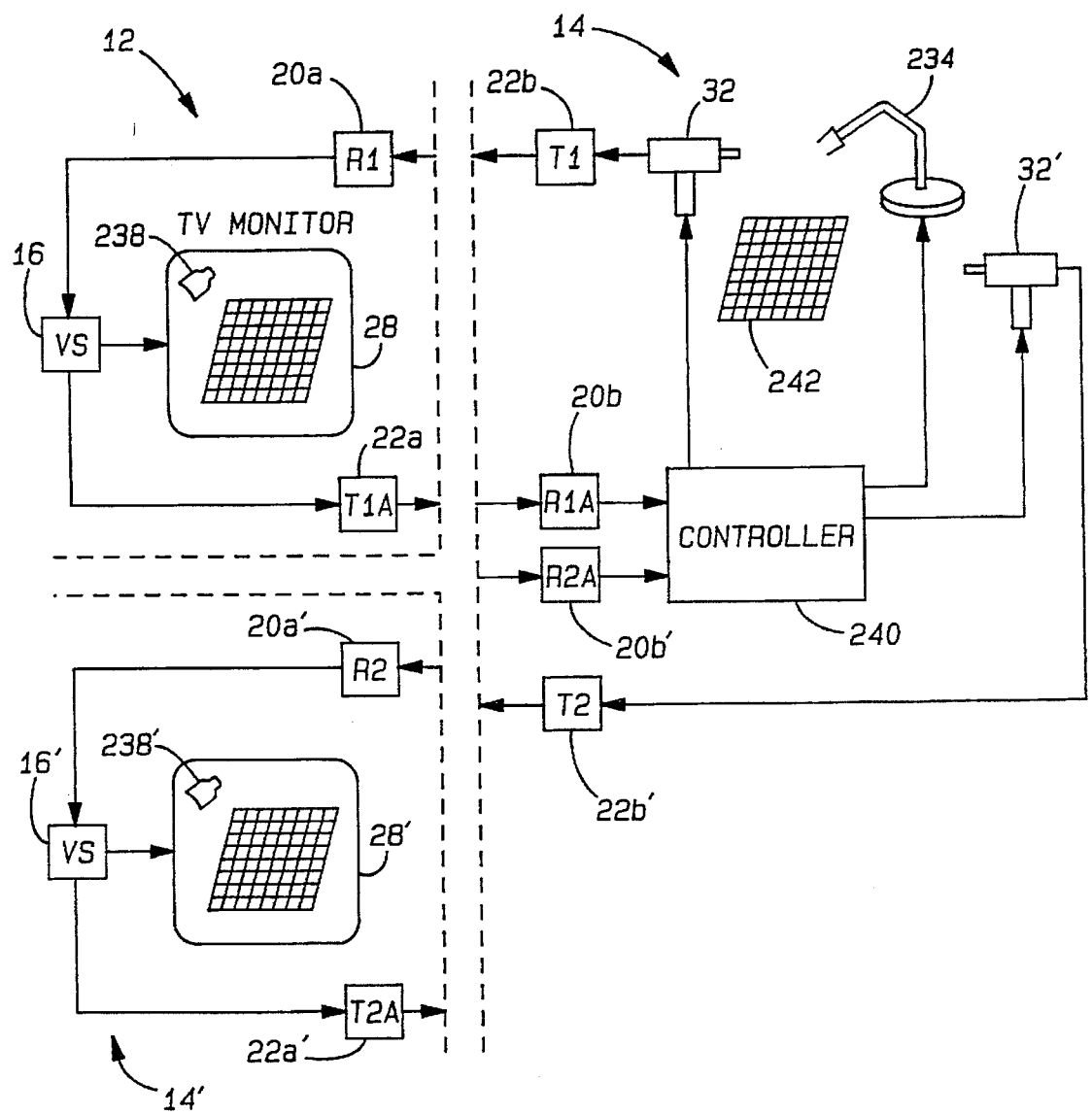
FIG. 23 depicts a remote site with a single robot arm and multiple cameras, each camera being associated with a particular local user to enable two local users to view a remote site individually and effect control of the robot arm at the remote site.

Referring to FIG. 23, an additional embodiment of this invention depicts a pair of local sites 12, 12', each having a visual signaller 16 and 16', monitors 28 and 28', communication interfaces receivers 20a and 20a', and communications interface transmitters 22a and 22a', respectively. Each component at each local site 12 and 12' operates substantially as described above. At the remote site 14, receiving units 20b and 20b' and communications transmitting interfaces 22b and 22b', cameras 32 and 32', and robot arm 234 are as described above. These second set of components (corresponding to the (') designation) enable an operator at remote site 14' to independently view the remote site 14 as would the operator of local site 12. Remote site 14 also includes a controller 240 incorporating a visual interpreter (36 of FIG. 1) and a device controller (38 of FIG. 1) and operating substantially as described with respect to FIG. 1. In addition, controller 240 includes circuitry for operating each of camera 32 and 32' and robot arm 234, including arbitration between possibly competing remote sites. In FIG. 22, the scene captured by camera 32 and 32' and displayed on monitors 28 and 28', respectively, would be that of, for example, a chess board 242. Through use of robot arm 234, operators at local sites 12 and 12' can use cursor 238 and 238' to select, for example, a chess piece for robot arm 234 to grasp and a destination position where robot arm 234 is to place the chess piece. In this manner, the operators can interactively control common components at a remote site. Of course, it will be understood that controller 240 also functions as an arbitrator to determine whether control of robot arm 234 is provided to local site 12 or local site 12'. Optionally, the controller 240 could arbitrate control of either camera 34 or 34' to either local site 12 or 12', depending on the particular design application and the requirements of the user.

Figure 24:
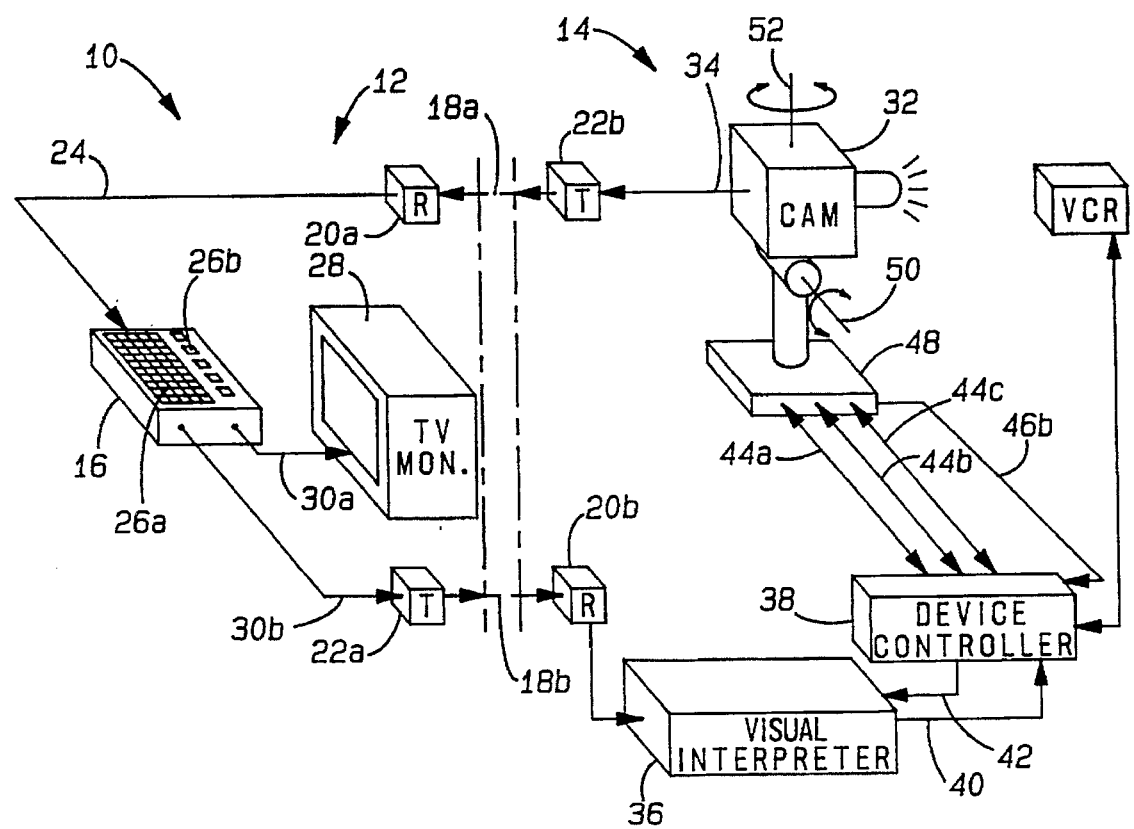
FIG. 24 depicts a remote camera site having an object in the view field of the camera which may be controlled in accordance with control commands from the visual signaller.

In a further embodiment of the present invention, the concept of controlling a controllable camera base 48 can be further extended to control additional devices. Referring to FIG. 24, the arrangement as described with respect to FIG. 1 is reproduced and a second device a video cassette controller (VCR) 250 is also shown. Device controller 38 is operable to also control VCR 250 as well as controllable camera base 48. VCR 250 may optionally be operated by a user at the remote site 14 or may be operated in accordance with control signals generated by device controller 38. Visual interpreter 36 therefore, recognizes icons to control controllable camera base 48 and VCR 250. As described with respect to FIG. 1, visual interpreter 36 decodes the information and provides the decoded gestures on control line 40 to device controller 38. Device controller 38 then determines which device is to be controlled, the controllable camera base 48 or VCR 250, and generates the appropriate control signals to operate that device. In operation, referring to FIG. 25, the viewing area of monitor 28 is shown and includes an image of the VCR 250 located at remote site 14 and referred to in FIG. 25 as 250'. To operate the VCR according to one embodiment, an icon 252 is placed over the button of the VCR signalling to the visual interpreter that control device 38 should effect that particular operation. For example, referring to VCR 250', button 254 represents a stop operation, button 256 represents a play operation and button 258 represents a fast forward operation. When cursor 252, also referred to as the press icon, is held over the stop button 254 for a sufficient time period, visual interpreter 36 interprets this as a command to start the VCR 250 in the play mode.

Figure 25:
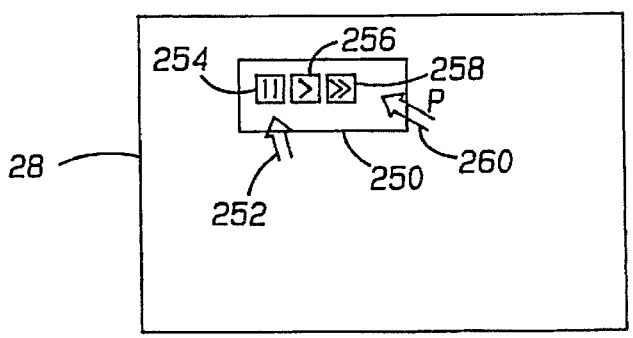
FIG. 25 depicts a viewing area of the television monitor located at the local site for controlling the device found at the remote site of FIG. 24.

In an alternative embodiment, the user at the local site 12 could use visual signaller 16 to provide operating commands by placing varying cursors onto the image of the VCR 250' on the monitor 28 viewing area. For example, assuming that the operator once again desires to start the VCR 250 in play mode. The operator could position a cursor or icon onto the VCR image 250'. In FIG. 25, the play icon 260 is placed over the VCR image 250'. Note that the P over the arrow shaped portion of icon 260 indicates the operator is requesting that the VCR 250 be put into the play mode. If the user desires to stop or rewind VCR 250, the user would use icon selector 26b to select a different icon, which may have a S or R above the arrow portion to indicate the stop or rewind request.

Figure 26:
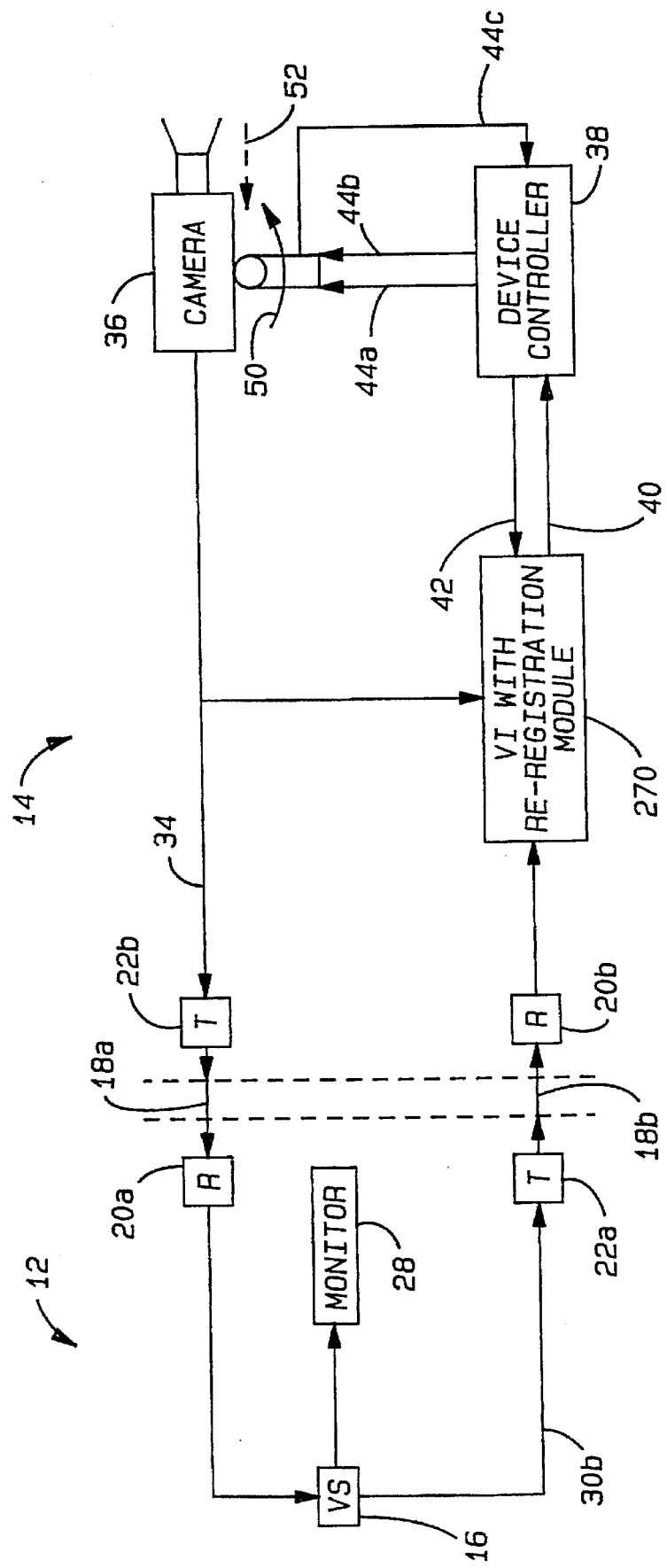
FIG. 26 depicts the configuration of FIG. 1 having a re-registration module for comparing the signal sent to the local site from the remote site from the remote site with the return signal received from the local site.

If the video signal sent to the user and returned to the remote site has undergone format conversions or other encodings or decodings, the relative (x,y) position of an object in the returned image may be slightly shifted with respect to the original. In order for the visual interpreter to make precise interpretations of locations in the returning image, the incoming video signal may need to be re-scaled and re-registered with the outgoing image, using well-known feature matching methods well known to those skilled in the art, as can be found with reference to S. Sull and N. Ahusa "Integrated Matching and Segmentation of Multiple Features in Two Views", Proceedings of Asian Conference on Computer Vision, Osaka, Japan, pp 213–216, November, 1993. Referring to FIG. 26, FIG. 26 depicts an apparatus for including the background registration function in a visual interpreter. The feature matching module 270 compares the outgoing and incoming images and adjusts the interpreted locations of icons accordingly. Such re-registration enables the visual interpreter to identify where any icon (such as a pointer) is placed with respect to the actual visual scene in the remote environment. FIG. 26 depicts a circuit coupling the visual interpreter with a re-registrating module 270 receiving the video image output on line 34. In this system, re-registration refers to matching background features at the remote site 14 found in the outgoing video signal 34 and the incoming video signal received from the local site. It will be understood by one skilled in the art that the configuration depicted in FIG. 26 is equally applicable to FIG. 24 where it is desired to perform re-registration as taught in FIG. 26.

Figure 27:
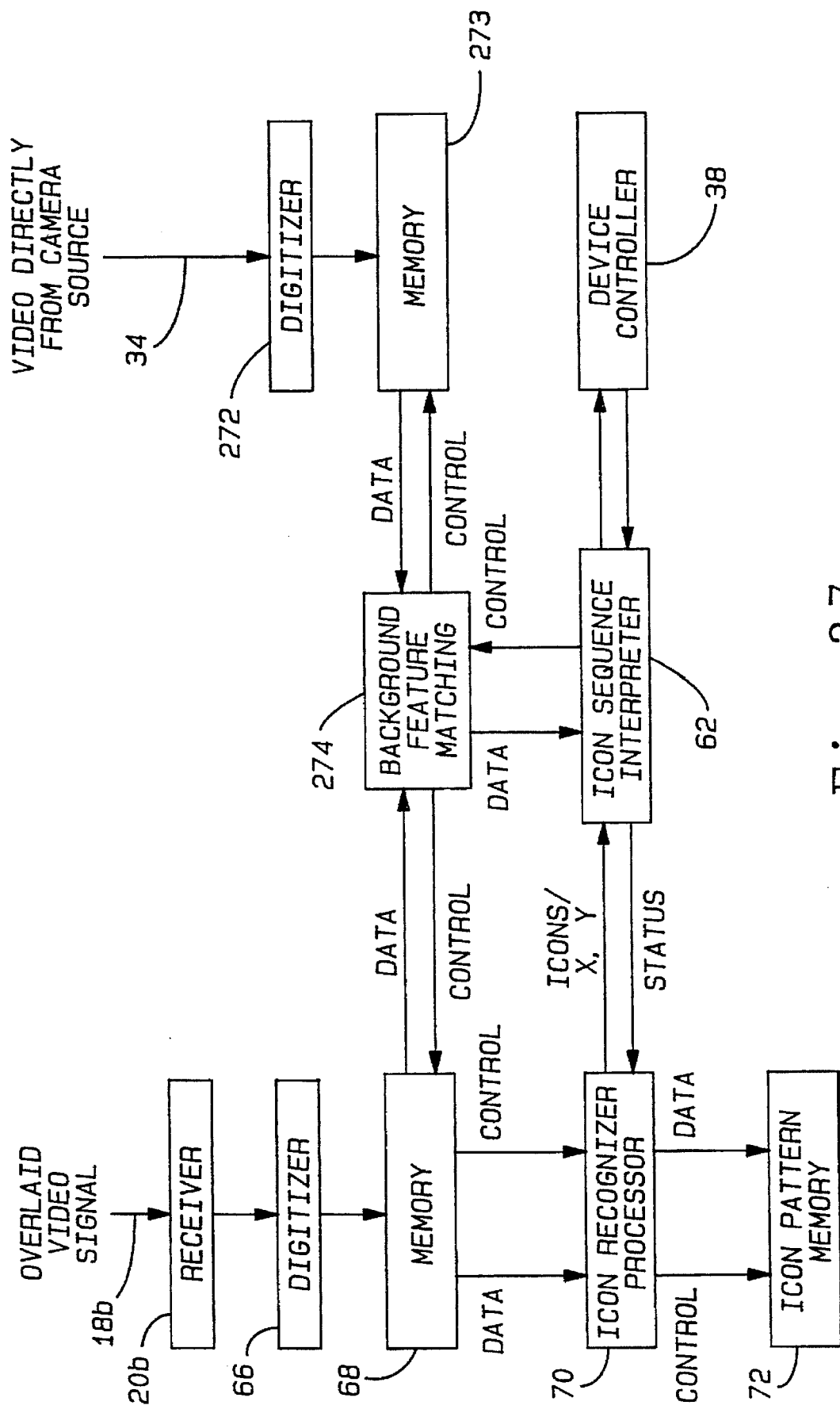
FIG. 27 depicts a block diagram of the re-registration module depicted in FIG. 26.

FIG. 27 provides an expanded block diagram of re-registration module 270. The overlaid video signal is stored in memory 68 and processed by the icon recognizer processor 70 as discussed earlier. When the icon sequence interpreter 62 needs to initiate a command, it will invoke the background feature matching module 274 to compare the images stored in memories 68 and 273. Memory 273 retrieves the image from digitizer 272 which receives the video from line 34. The background feature matching module 274 compares both image fields in memory to see if the camera views are different (by looking at a various background artifacts and searching for differences in the x positions, y position, z positions, rotational differences, etc). If so, it will take the difference in view in account when outputting a control command to the device controller 38.

The recognition of the VCR as the device "pointed to" can then be done by including in the visual interpreter certain well-known methods for orienting and scaling camera views with CAD models of the environment, as can be found with reference to Bie Bhanu, "CAD-Based Robot Vision", IEEE Vision, pp 13–16, August, 1987. The oriented CAD models enable the calculation and maintenance of camera-view locations of known objects in the environment. The user's iconic gesturing within the returned images can then be interpreted with reference to the locations of these known objects located within those images. The methods for orienting, scaling and registration of CAD models of the environment can exploit the same background feature matching module used for basic outgoing vs incoming image re-registration. The camera viewpoint is known from the camera neck control parameters. This viewpoint is used to generate a CAD model view of the environment, leading to expectations of image locations of objects (such as a VCR), which are then registered precisely be feature matching the CAD projection of the objects with object edges and details from the real scene image.

FIG. 27 depicts an implementation that, in addition to the features shown in FIG. 26, matches CAD models 275 of objects and features to the features found in the Background Feature Matching module 274. When a match is found, and icon placed over that object by the visual signaller 16 will be interpreted by the icon sequence interpreter 62.

It is to be understood that the invention is not limited to the exact construction illustrated and described above, but that various changes and modifications may be made without departing from the spirit and scope of the invention as defined in the following claims.

We claim:

1. An apparatus for enabling an operator to receive an incoming video signal and to imbed command information in an outgoing video signal in order to control a device, comprising:

means for generating the command information in the form of a visually iconic gesture overlaid onto the incoming video signal to define the outgoing video signal, the visually iconic gesture being interpretable by the operator and conveying the command information in accordance with its location within the outgoing video signal;

processing means for receiving the outgoing video signal having the visually iconic gesture and decoding the iconic gesture into the command information conveyed by the iconic gesture, the processing means outputting the command information; and device control means for receiving the command information output by the processing means and transforming the command information into control commands for operating the device in accordance with the command information conveyed in the visually iconic gesture.

2. The apparatus as defined in claim 1 further comprising:

a local site at which is located the operator and the generating means; and a remote site at which is located the processing means and the device control means.

3. The apparatus as defined in claim 2 further comprising a communications interface for establishing a communications link between the local site and the remote site, the communications link enabling transmission of the incoming video signal from the remote site to the local site and enabling transmission of the overlaid video signal from the local site to the remote site.

4. The apparatus as defined in claim 3 further comprising a monitor means interconnected to the means for generating command information, the monitor means displaying the received video signal and the visually iconic gesture overlaid thereon in order to enable an operator to view the iconic gesture and its relative position within the received video signal.

5. The apparatus as defined in claim 4 wherein the means for generating command information further comprises:

means for positioning the iconic gesture, the iconic gesture being overlaid into the receiving video signal and viewable by the operator on the monitoring means; and means for selecting at least one of a plurality of candidate iconic gestures, the selected at least one iconic gesture being positionable in accordance with operation of the positioning means.

6. The apparatus as defined in claim 1 wherein the means for generating command information further comprises:

means for positioning the iconic gesture, the iconic gesture being overlaid into the receiving video signal and viewable by the operator on the monitoring means; and means for selecting at least one of a plurality of candidate iconic gestures, the selected at least one iconic gesture being positionable in accordance with operation of the positioning means.

7. The apparatus as defined in claim 6 wherein the means for generating the iconic gesture further comprises a video overlay mixer for overlaying onto the incoming video signal the command information in the form of the iconic gesture and the position within the incoming video signal, the means for generating the iconic gesture outputting an overlaid video signal to a monitor.

8. The apparatus as defined in claim 1 wherein the means for generating the iconic gesture further comprises a video overlay mixer for overlaying onto the incoming video signal the command information in the form of the iconic gesture and the position within the incoming video signal, the means for generating the iconic gesture outputting an overlaid video signal to a monitor and to the processing means.

9. The apparatus as defined in claim 1 wherein the processing means for decoding the outgoing video signal further comprises:

means for extracting from the overlaid video signal information including a command icon and a position of the command icon; and means for interpreting the iconic information extracted from the overlaid video signal.

10. The apparatus as defined in claim 9 wherein said means for extracting further comprises:

memory for storing a digitized video signal;

pattern memory for storing in digitized form at least a portion of a candidate icon recognizable by the extracting means; and icon recognizer means for comparing the at least a portion of the candidate icon stored in pattern memory with the digitized video signal stored in memory, the icon recognizer outputting a signal in accordance with a recognized icon.

11. The apparatus as defined in claim 9 wherein the incoming signal is an analog signal and the apparatus further comprises a digitizing means for digitizing the analog incoming video signal to yield a digital representation of the incoming video signal.

12. The apparatus as defined in claim 9 wherein the incoming video signal is a digital signal and the apparatus further includes signal processing means to condition the incoming video signal for storage in memory.

13. The apparatus as defined in claim 1 wherein the device to be controlled comprises:

a controllable camera base arranged to enable motion in at least one degree of freedom, said camera base comprising:

a camera mounted to said camera base;

a first means for enabling the camera base to operate in the at least one degree of freedom; and communication means for communicating with the device control means, the communication means sending and receiving control signals to operate the camera base in the at least one degree of freedom.

14. The apparatus as defined in claim 13 wherein the enabling means comprises a motor.

15. The apparatus as defined in claim 13 wherein the means for generating command information is operable to insert visual information defining a centering icon, and the control means is operable to position the controllable base to center the camera view area about a point selected in accordance with the centering icon.

16. The apparatus as defined in claim 13 wherein the means for generating command information is operable to insert a visual iconic gesture defining a pan/tilt icon, and the control means is operable to position the controllable base in a direction and a rate in accordance with the direction and magnitude, respectively, of a displacement of the pan/tilt icon from a center of the camera view area.

17. The apparatus as defined in claim 13 wherein the means for generating command information is operable to insert a visual iconic gesture information defining a move icon, and the control means is operable to position the controllable base in accordance with the position of a first and second move gesture where the first move icon defines a starting point for the move and a second move gesture defines a final point for the move where camera base is displaced such that the final point of the view area is displaced to the initial point of the view area.

18. The apparatus as defined in claim 1 wherein the controlled device is a robot arm which receives control signals from the device control means and is manipulable in accordance with the control signal.

19. The apparatus as defined in claim 1 wherein the controlled device is an electronically controlled device which receives control signals from the device control means and is operable in accordance with the control signal.

20. A remote control video apparatus in which an operator at a local site which receives an incoming video signal from a remote site can generate commands to operate a device located at the remote cite, comprising:
    a visual signaller for receiving the incoming video signal from the remote site, the visual signaller operable to overlay visual command information onto the incoming video signal to define an outgoing video signal, the visual signaler being operable to output the outgoing video signal for transmission to the remote site, the visual command information being visually interpretable by a user at the local or remote site;
    a visual interpreter for decoding the overlaid video signal in order to determine the visual command information overlaid onto the incoming video signal and for outputting the decoded visual command information; and
    a device controller for receiving visual command information decoded by the visual interpreter, the device controller generating a command for operating the device in accordance with the visual command information overlaid onto the overlaid video signal.

21. The apparatus as defined in claim 20 wherein the apparatus further comprises a monitor for displaying the overlaid video signal output by the visual signaller.

22. The apparatus as defined in claim 21 wherein the visual signaller further comprises:
    a graphics locator means for manipulating a pointer overlaid onto the video signal to enable the operator to view the position of the visual command information; and
    an icon selector to enable an operator to select at least one of a plurality of icons corresponding to at least one of a plurality of candidate commands to operate the device at the remote site.

23. The apparatus as defined in claim 20 wherein the visual signaller further comprises:
    a graphics locator means for manipulating a pointer overlaid onto the video signal to enable the operator to view the position of the visual command information; and
    an icon selector to enable an operator to select at least one of a plurality of icons corresponding to at least one of a plurality of candidate commands to operate the device at the remote site.

24. The apparatus as defined in claim 20 wherein the device to be operated at the remote cite is a controllable camera base for supporting a camera, where the controllable base is controllable for positioning the camera.

25. The apparatus as defined in claim 24 wherein the controllable base is operable to pan in a horizontal direction and tilt in a vertical direction.

26. A visual controller for receiving a video signal and generating visually interpretable control commands related to the received video signal and inserted into an outgoing video signal for controlling a remote device, comprising:
    a selector for inserting into the outgoing video signal at least one visually interpretable gesture, the gesture being decodable into a partial control command for controlling the remote device; and
    a gesture positioner for positioning the at least one selected gesture onto the outgoing video signal where the position of the at least one selected gesture supplements the control command in accordance with the position of the at least one selected gesture.

27. The visual control device defined in claim 26 further comprising a display means for displaying the incoming video signal and the at least one selected gesture overlaid onto the incoming video signal, wherein an operator may view on the display means the command information to be inserted into the outgoing video signal.

28. The visual control device as defined in claim 26 wherein the outgoing signal includes the incoming video signal having overlaid thereon the gesture information inserted by the visual control device.

29. The visual control device as defined in claim 26 further comprising a video overlay mixer for receiving the incoming video signal and a signal representing the at least one selected gesture positioned by the gesture positioner, and for providing the outgoing video signal including the incoming signal having inserted thereon the at least one selected gesture.

30. The visual signaller as defined in claim 26 wherein the gesture positioner is one of a joy stick, a graphics locator pad, and a track ball.

31. A visual interpreter for detecting the presence of at least one gesture in an incoming video signal and generating device control commands in accordance with the control commands in the incoming video signal, comprising:
    means for extracting the at least one gesture from the incoming video signal, the gesture being visually interpretable when displayed on a display means; and
    means for interpreting the extracted gesture and providing device control commands to a device controller, the device controller operating the controlled device in accordance with the device control commands.

32. The visual interpreter as defined in claim 31 wherein the incoming video signal is an analog signal, and the means for extracting further comprises a digitizer for creating a digitized representation of the analog signal and memory for storing the digitized representation of the analog signal.

33. The visual interpreter as defined in claim 31 wherein the incoming video signal is a digital signal, and the means for extracting further comprises a memory for storing the digital incoming video signal.

34. The visual interpreter as defined in claim 33 further comprising signal processing means for conditioning the incoming video signal.

35. The visual interpreter as defined in claim 31 further comprising a memory for storing the incoming video signal.

36. The visual interpreter as defined in claim 31 further comprising a gesture pattern memory having stored therein at least one of a plurality of candidate gestures.

37. The visual interpreter as defined in claim 31 wherein:

the incoming video signal is an analog signal, and the means for extracting further comprises a digitizer for creating a digitized representation of the analog signal and memory for storing the digitized representation of the analog signal; and a gesture pattern memory having stored therein at least one of a plurality of candidate gestures, where the means for extracting the at least one gesture compares at least a portion of the digitized representation of the analog signal with at least one of the plurality of candidate gestures.

38. The apparatus as defined in claim 37 further wherein:

the incoming video signal is a digital signal, and the means for extracting further comprises a memory for storing the digital incoming video signal; and a gesture pattern memory having stored therein at least one of a plurality of candidate gestures recognized by the means for extracting, where the means for extracting the at least one gesture compares at least a portion of the digitized representation of the analog signal with at least one of the plurality of candidate gestures.

39. An apparatus for enabling an operator to remotely control a device, comprising:

a received video signal input to the apparatus, the video signal having an object located therein;

means for generating command information in the form of a visually iconic gesture overlaid onto the received video signal to define an output video signal, where the visually iconic gesture has a meaning which varies in accordance with the position of the visually iconic gesture relative to the object, and where the visually iconic gesture is interpretable by the operator;

processing means for receiving outgoing video signal and decoding the outgoing video signal into the command information conveyed by the visually iconic gesture and the position of the visually iconic gesture relative to the object in the incoming video signal, the processing means outputting decoded command information to control the object on which the visually iconic gesture is located; and device control means for receiving the decoded command information output by the processing means and transforming the command information into control commands for operating the object in accordance with the command information conveyed in the visually iconic gesture.

40. The apparatus as defined in claim 39 further comprising:

an imaging device to provide the received video signal, the imaging device scanning and capturing a portion of a predetermined area defined in accordance with a specific orientation of the imaging device;

memory having stored therein candidate objects and a corresponding location of each candidate object, the object being determinable in accordance with its predetermined location;

mapping means for correlating the orientation of the imaging device and the objects stored in memory in accordance with the location of the object and the orientation of the imaging means.

41. A method for controlling a remotely located device, comprising the steps of:

generating command information in the form of a visually iconic gesture overlaid onto an outgoing video signal, the visually iconic gesture being interpretable by the operator and conveying command information in accordance with its location within the outgoing video signal;

processing the outgoing video signal having the visually iconic gesture to decode the iconic gesture into the command information conveyed by the iconic gesture, the processing means outputting the command information; and transforming the command information into control commands for operating the device in accordance with the command information conveyed in the visually iconic gesture.

* * * * *